US012692908B2

(12) United States Patent
Kobayashi et al.

(10) Patent No.: US 12,692,908 B2
(45) Date of Patent: Jul. 28, 2026

(54) CLUTCH APPARATUS

(71) Applicant: Kabushiki Kaisha F.C.C., Hamamatsu (JP)

(72) Inventors: Yuki Kobayashi, Hamamatsu (JP); Katsu Yoshimoto, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 19/254,353

(22) Filed: Jun. 30, 2025

(65) Prior Publication Data

US 2025/0327492 A1 Oct. 23, 2025

Related U.S. Application Data

(63) Continuation of application No. PCT/JP2024/002006, filed on Jan. 24, 2024.

(30) Foreign Application Priority Data

Feb. 21, 2023 (JP) ................................. 2023-025454

(51) Int. Cl.
*F16D 13/56* (2006.01)
*F16D 23/12* (2006.01)

(52) U.S. Cl.
CPC ........ *F16D 13/56* (2013.01); *F16D 2013/565* (2013.01); *F16D 2023/123* (2013.01)

(58) Field of Classification Search
CPC .... F16D 13/56; F16D 13/54; F16D 2013/565; F16D 2013/706; F16D 2023/123
See application file for complete search history.

(56) References Cited

U.S. PATENT DOCUMENTS

| | | | | |
|---|---|---|---|---|
| 8,256,595 | B2 * | 9/2012 | Gokan | ................... F16D 13/56 |
| | | | | 192/54.5 |
| 9,631,679 | B2 * | 4/2017 | Adachi | .................. F16D 23/12 |
| 11,460,077 | B2 * | 10/2022 | Ozawa | ................... F16D 43/12 |
| 2015/0337910 | A1 | 11/2015 | Yoshimoto et al. | |
| 2015/0377303 | A1 | 12/2015 | Adachi et al. | |
| 2021/0356000 | A1 | 11/2021 | Ozawa et al. | |
| 2022/0356912 | A1 | 11/2022 | Brown et al. | |

FOREIGN PATENT DOCUMENTS

| | | |
|---|---|---|
| JP | 2012172799 A | 9/2012 |
| JP | 2020090988 A | 6/2020 |
| JP | 2022173521 A | 11/2022 |
| WO | 2013183588 A1 | 12/2013 |
| WO | 2014157631 A1 | 10/2014 |

OTHER PUBLICATIONS

International Search Report in PCT/JP2024/002006, mailed Mar. 19, 2024, 2 pages.
Official Communication issued in corresponding European Patent Application No. 24760006.7, mailed on May 6, 2026, 8 pages.

* cited by examiner

*Primary Examiner* — Huan Le
(74) *Attorney, Agent, or Firm* — Keating & Bennett, LLP

(57) ABSTRACT

A clutch apparatus includes a clutch center, a pressure assembly, a disc spring provided concentrically with the pressure assembly and urging the pressure assembly in a first direction, and clutch springs urging the pressure assembly in the first direction. The clutch center includes spring housing portions housing the clutch springs. An outer edge of the disc spring in a radial direction of an output shaft is located radially outward of the clutch springs.

9 Claims, 14 Drawing Sheets

*FIG.11*

CLUTCH APPARATUS

CROSS REFERENCE TO RELATED APPLICATIONS

This application claims the benefit of priority to Japanese Patent Application No. 2023-025454, filed on Feb. 21, 2023, and is a Continuation Application of PCT Application No. PCT/JP2024/002006, filed on Jan. 24, 2024. The entire contents of each application are hereby incorporated herein by reference.

BACKGROUND OF THE INVENTION

1. Field of the Invention

The present invention relates to clutch apparatuses.

2. Description of the Related Art

Straddled vehicles, such as motorcycles, each include a clutch apparatus that is able to transmit a rotational driving force of a power source, such as an engine, to a driving wheel and cut off the rotational driving force. JP 2022-173521A, for example, discloses a clutch apparatus including an input member (which will hereinafter be referred to as an "input shaft") connected to an engine or its associated component(s), an output member (which will hereinafter be referred to as an "output shaft") connected to a driving wheel or its associated component(s), a clutch member (which will hereinafter be referred to as a "clutch center") connected to the output shaft; and a pressure member (which will hereinafter be referred to as a "pressure member") movable toward or away from the clutch center.

SUMMARY OF THE INVENTION

The clutch apparatus disclosed in JP 2022-173521A includes a clutch spring and a release spring (which will hereinafter be referred to as a "disc spring") that urge the pressure member toward the clutch center. The disc spring is located inward of a radially outer edge of the clutch spring and is relatively small. This unfortunately makes it difficult for the disc spring to urge the pressure member with a large load, resulting in a low degree of flexibility in load setting for the disc spring.

Example embodiments of the present invention provide clutch apparatuses each achieving a high degree of flexibility in load setting for a disc spring.

A clutch apparatus according to an example embodiment of the present invention is a clutch apparatus to transmit a rotational driving force of an input shaft to an output shaft or cut off the rotational driving force and includes a clutch center housed in a clutch housing holding input-side rotary plates to be rotationally driven in response to rotational driving of the input shaft, the clutch center holding output-side rotary plates arranged alternately with the input-side rotary plates, the clutch center being rotationally driven together with the output shaft, a pressure assembly movable toward or away from the clutch center and rotatable relative to the clutch center, the pressure assembly being able to push the input-side rotary plates and the output-side rotary plates, a disc spring provided concentrically with the pressure assembly, the disc spring urging the pressure assembly in a first direction, assuming that a direction in which the pressure assembly moves toward the clutch center is the first direction and a direction in which the pressure assembly moves away from the clutch center is a second direction, and a clutch spring urging the pressure assembly in the first direction. The clutch center includes a housing portion to house the clutch spring. An outer edge of the disc spring in a radial direction of the output shaft is located outward of the clutch spring in the radial direction.

In a clutch apparatuses according to an example embodiment of the present invention, the outer edge of the disc spring in the radial direction of the output shaft is located radially outward of the clutch spring. This enables the disc spring to be increased in diameter, with the result that the disc spring is able to urge the pressure assembly toward the clutch center with a larger load. Consequently, the present example embodiment of the present invention permits the clutch apparatus to have a high degree of flexibility in load setting for the disc spring.

Example embodiments of the present invention provide clutch apparatuses each achieving a high degree of flexibility in load setting for a disc spring.

The above and other elements, features, steps, characteristics and advantages of the present invention will become more apparent from the following detailed description of the example embodiments with reference to the attached drawings.

BRIEF DESCRIPTION OF THE DRAWINGS

FIG. 11 is a perspective view of a second pressure structure according to an example embodiment of the present invention.

DETAILED DESCRIPTION OF THE EXAMPLE EMBODIMENTS

Example embodiments of clutch apparatuses according to the present invention will be described below with reference to the drawings. The example embodiments described herein are naturally not intended to limit the present invention in any way. Components and elements having the same functions will be identified by the same reference signs and will not be described or will be described briefly when deemed redundant.

Figure 1:
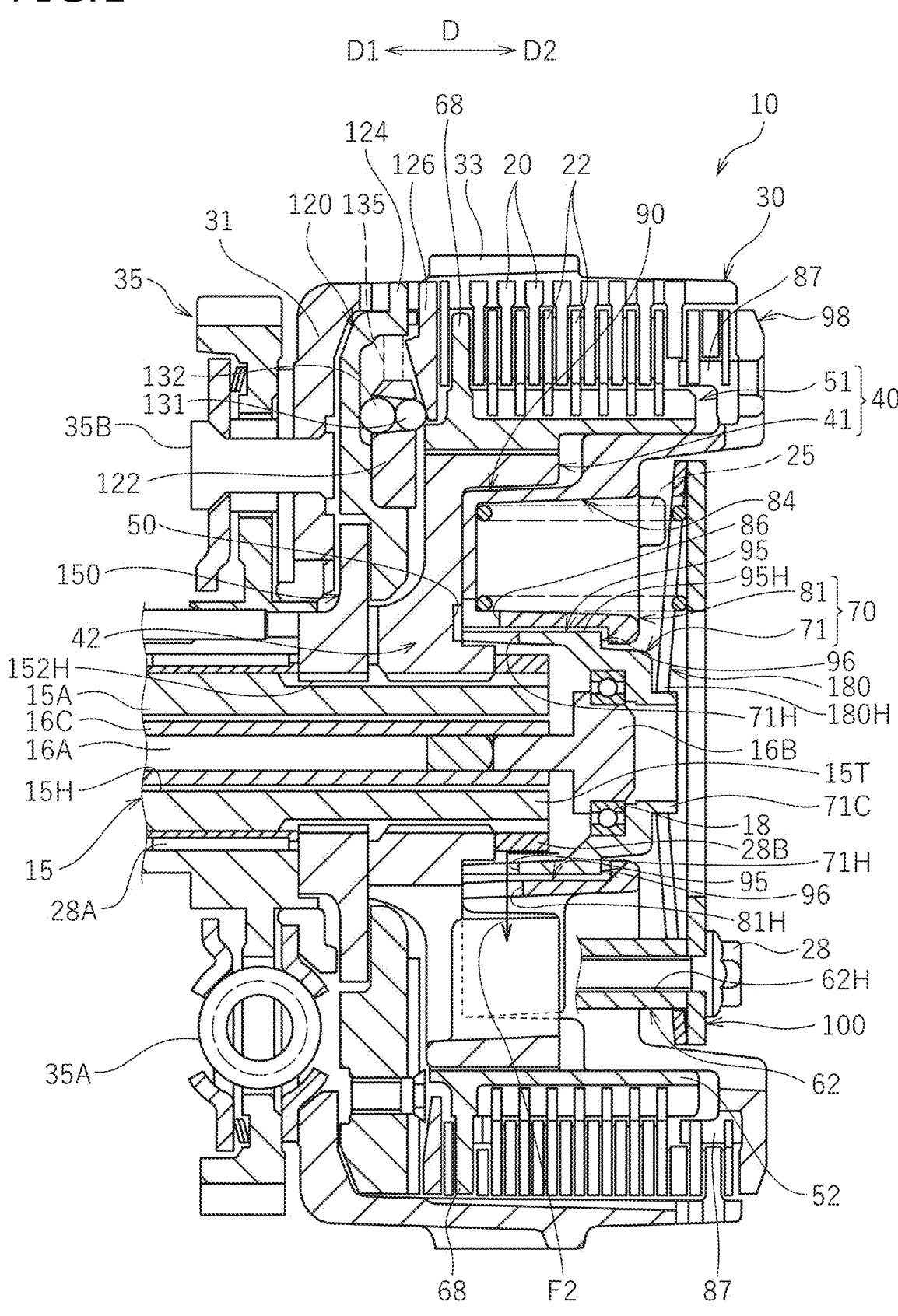
FIG. 1 is a cross-sectional view of a clutch apparatus according to an example embodiment of the present invention.

FIG. 1 is a cross-sectional view of a clutch apparatus 10 according to the present example embodiment. The clutch apparatus 10 is preferably installed, for example, on a straddled vehicle, such as a motorcycle. The clutch apparatus 10 is, for example, an apparatus to transmit a rotational driving force of an input shaft (e.g., a crankshaft) of an engine, which is a power source of a motorcycle, to an output shaft 15 or cut off the rotational driving force. The clutch apparatus 10 is an apparatus to transmit the rotational driving force of the input shaft to a driving wheel (e.g., a rear wheel) through the output shaft 15 or cut off the rotational driving force. The clutch apparatus 10 is between the engine and a transmission.

In the following description, a direction in which a pressure assembly 70 of the clutch apparatus 10 moves toward and away from a clutch center 40 will be referred to as a "direction D", a direction in which the pressure assembly 70 moves toward the clutch center 40 will be referred to as a "first direction D1", and a direction in which the pressure assembly 70 moves away from the clutch center 40 will be referred to as a "second direction D2". A circumferential direction (i.e., a rotational direction) of the clutch center 40 and the pressure assembly 70 will be referred to as a "circumferential direction S". A direction from a first one of center-side cam portions 60 to a second one of the center-side cam portions 60 (which corresponds to a direction from a first one of pressure-side cam portions 90 to a second one of the pressure-side cam portions 90) in the circumferential direction S will be referred to as a "first circumferential direction S1" (see FIG. 3). A direction from the second one of the center-side cam portions 60 to the first one of the center-side cam portions 60 (which corresponds to a direction from the second one of the pressure-side cam portions 90 to the first one of the pressure-side cam portions 90) in the circumferential direction S will be referred to as a "second circumferential direction S2" (see FIG. 3). In the present example embodiment, an axial direction of the output shaft 15 corresponds to the direction D. The pressure assembly 70 and the clutch center 40 rotate in the first circumferential direction S1 (i.e., a direction from a center-side assist cam surface 60A of each center-side cam portion 60 to a center-side slipper cam surface 60S thereof). These directions, however, are defined merely for the sake of convenience of description and thus do not limit in any way how the clutch apparatus 10 may be installed or do not limit in any way the present invention.

As illustrated in FIG. 1, the clutch apparatus 10 preferably includes the output shaft 15, input-side rotary plates 20, output-side rotary plates 22, a clutch housing 30, the clutch center 40, the pressure assembly 70, a stopper plate 100, a centrifugal clutch mechanism 120, an auxiliary clutch plate 150, and a disc spring 180.

As illustrated in FIG. 1, the output shaft 15 is preferably a hollow shaft body. A first end portion of the output shaft 15 supports an input gear 35 and the clutch housing 30 (which will be described below) through a needle bearing 28A such that the input gear 35 and the clutch housing 30 are rotatable. The output shaft 15 supports the clutch center 40 through a nut 28B such that the clutch center 40 is fixed to the output shaft 15. In other words, the output shaft 15 rotates together with the clutch center 40. A second end portion of the output shaft is connected to, for example, the transmission (not illustrated) of the motorcycle.

As illustrated in FIG. 1, the output shaft 15 includes a body 15A extending in the direction D. The body 15A internally includes an oil flow passage 15H through which clutch oil flows. The oil flow passage 15H is defined between the body 15A and a sleeve 16C externally fitted to a push rod 16A (which will be described below). Clutch oil flows through the output shaft 15. Specifically, clutch oil flows through the oil flow passage 15H of the body 15A.

As illustrated in FIG. 1, the push rod 16A and a portion of a pusher 16B adjacent to the push rod 16A are provided in the oil flow passage 15H of the output shaft 15. The push rod 16A and the pusher 16B are slidable within the sleeve 16C. A first end portion of the push rod 16A (i.e., a left end portion of the push rod 16A in FIG. 1) is connected to a clutch operation lever (not illustrated) of the motorcycle such that the push rod 16A slides within the sleeve 16C in response to an operation performed on the clutch operation lever and thus pushes the pusher 16B in the second direction D2. A portion of the pusher 16B is protruded out of the output shaft 15 (i.e., in the second direction D2 in this example embodiment) and connected to a release bearing 18 provided on the pressure assembly 70. The sleeve 16C and the pusher 16B are each smaller than an inner diameter of the body 15A such that clutch oil is allowed to flow through the oil flow passage 15H.

The clutch housing 30 is preferably made of an aluminum alloy, for example. The clutch housing 30 includes a cylindrical shape with a bottom. As illustrated in FIG. 1, the clutch housing 30 includes a circular or substantially circular bottom wall 31 and a side wall 33 extending in the second direction D2 from an edge of the bottom wall 31. The clutch housing 30 holds the input-side rotary plates 20.

As illustrated in FIG. 1, the bottom wall 31 of the clutch housing 30 is provided with the input gear 35. The input gear 35 is secured through a torque damper 35A to the bottom wall 31 with a rivet 35B. The input gear 35 meshes together with a driving gear (not illustrated) that rotates in response to rotational driving of the input shaft of the engine. The input gear 35 is rotationally driven independently of the output shaft 15 and together with the clutch housing 30.

The input-side rotary plates 20 are rotationally driven in response to rotational driving of the input shaft. As illustrated in FIG. 1, the input-side rotary plates 20 are held by an inner peripheral surface of the side wall 33 of the clutch housing 30. The input-side rotary plates 20 are preferably held by the clutch housing 30 through spline-fitting, for example. The input-side rotary plates 20 are movable in an axial direction of the clutch housing 30 (i.e., the direction D). The input-side rotary plates 20 are rotatable together with the clutch housing 30.

The input-side rotary plates 20 are components to be pushed against the output-side rotary plates 22. The input-side rotary plates 20 each have an annular shape. The input-side rotary plates 20 are preferably formed through aluminum die casting, for example. Friction materials (not illustrated) made of pieces of paper are affixed to front and back surfaces of the input-side rotary plates 20. Grooves to retain clutch oil are preferably provided between the friction materials to a depth of a few or several hundreds of μm.

As illustrated in FIG. 1, the clutch center 40 is housed in the clutch housing 30. The clutch center 40 is provided concentrically with the clutch housing 30. The clutch center 40 holds the output-side rotary plates 22 alternately provided with the input-side rotary plates 20 in the direction D. The clutch center 40 is rotationally driven together with the output shaft 15. The clutch center 40 includes a first clutch center 41 and a second clutch center 51. The first clutch center 41 and the second clutch center 51 are assembled to each other. The second clutch center 51 is located radially outward of the first clutch center 41. The second clutch center 51 is externally fitted to the first clutch center 41.

Figure 3:
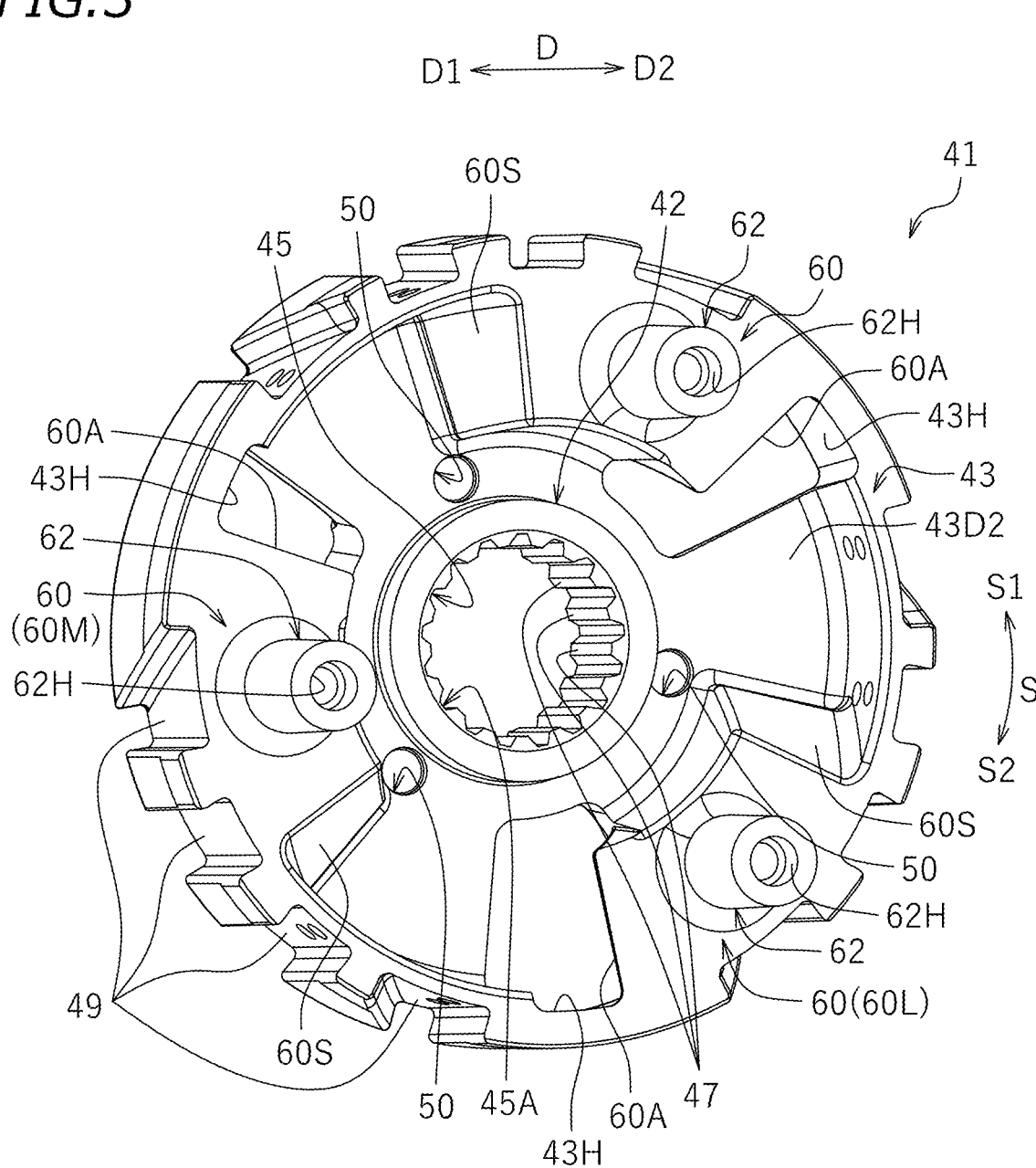
FIG. 3 is a perspective view of a first clutch center according to an example embodiment of the present invention.

As illustrated in FIG. 3, the first clutch center 41 preferably includes an output shaft holder 42, an annular base wall 43 located radially outward of the output shaft holder 42, and the center-side cam portions 60.

As illustrated in FIG. 1, the output shaft 15 is connected to the output shaft holder 42. A first pressure structure 71 (which will be described below) is externally fitted to the output shaft holder 42. As illustrated in FIG. 3, the output shaft holder 42 preferably has a cylindrical shape. The output shaft holder 42 is provided with an insertion hole 45 into which the output shaft 15 is inserted and spline-fitted. The insertion hole 45 is provided through the output shaft holder 42. An inner wall 45A of the output shaft holder 42, which defines the insertion hole 45, is provided with fitting teeth 47 extending in the axial direction of the output shaft 15 (i.e., the direction D). The fitting teeth 47 are fitted to the output shaft 15.

The center-side cam portions 60 are each in the shape of a block with cam surfaces that are inclined surfaces included in an assist & slipper (registered trademark) mechanism to produce an assist torque, which is a force to increase a pushing force (or pressing force) of the input-side rotary plates 20 and the output-side rotary plates 22, or a slipper torque, which is a force to reduce the pushing force (or pressing force) of the input-side rotary plates 20 and the output-side rotary plates 22 to make a transition to a half-clutch state. As illustrated in FIG. 3, the center-side cam portions 60 protrude in the second direction D2 from a surface 43D2 of the base wall 43 located in the second direction D2. The center-side cam portions 60 are provided at equal or substantially equal intervals in the circumferential direction S of the first clutch center 41. In the present example embodiment, the number of center-side cam portions 60 included in the first clutch center 41 is preferably three. The number of center-side cam portions 60, however, is not limited to three and can instead be any desirable number.

As illustrated in FIG. 3, the center-side cam portions 60 are located radially outward of the output shaft holder 42. The center-side cam portions 60 include the center-side assist cam surfaces 60A (see also FIG. 4) and the center-side slipper cam surfaces 60S. The center-side assist cam surfaces 60A are configured to, upon being rotated relative to the pressure assembly 70, produce a force in a direction in which the pressure assembly 70 is moved toward the clutch center 40 in order to increase the pushing force (or pressing force) for the input-side rotary plates 20 and the output-side rotary plates 22. In the present example embodiment, when the force is produced, the position of the pressure assembly 70 relative to the clutch center 40 remains unchanged, making it unnecessary for the pressure assembly 70 to physically move toward the clutch center 40. Alternatively, the pressure assembly 70 may physically move relative to the clutch center 40. The center-side slipper cam surfaces 60S are configured to, upon being rotated relative to the pressure assembly 70, move the pressure assembly 70 away from the clutch center 40 in order to reduce the pushing force (or pressing force) for the input-side rotary plates 20 and the output-side rotary plates 22. The center-side assist cam surface 60A of a first center-side cam portion 60L, which is one of the center-side cam portions 60 adjacent to each other in the circumferential direction S, and the center-side slipper cam surface 60S of a second center-side cam portion 60M, which is another one of the center-side cam portions 60 adjacent to each other in the circumferential direction S, face each other in the circumferential direction S.

As illustrated in FIG. 3, the first clutch center 41 includes bosses 62 (the number of which is three in the present example embodiment). The bosses 62 are components supporting the pressure assembly 70. The bosses 62 are provided at equal or substantially equal intervals in the circumferential direction S. The bosses 62 each have a cylindrical shape. The bosses 62 are located radially outward of the output shaft holder 42. The bosses 62 extend toward the pressure assembly 70 (i.e., in the second direction D2). The bosses 62 are provided on the center-side cam portions 60. The bosses 62 are each provided between the associated center-side assist cam surface 60A and the associated center-side slipper cam surface 60S in the circumferential direction S. The bosses 62 are provided with threaded holes 62H into which bolts 28 (see FIG. 1) are inserted. The threaded holes 62H extend in an axial direction of the clutch center 40 (i.e., the direction D).

Figure 4:
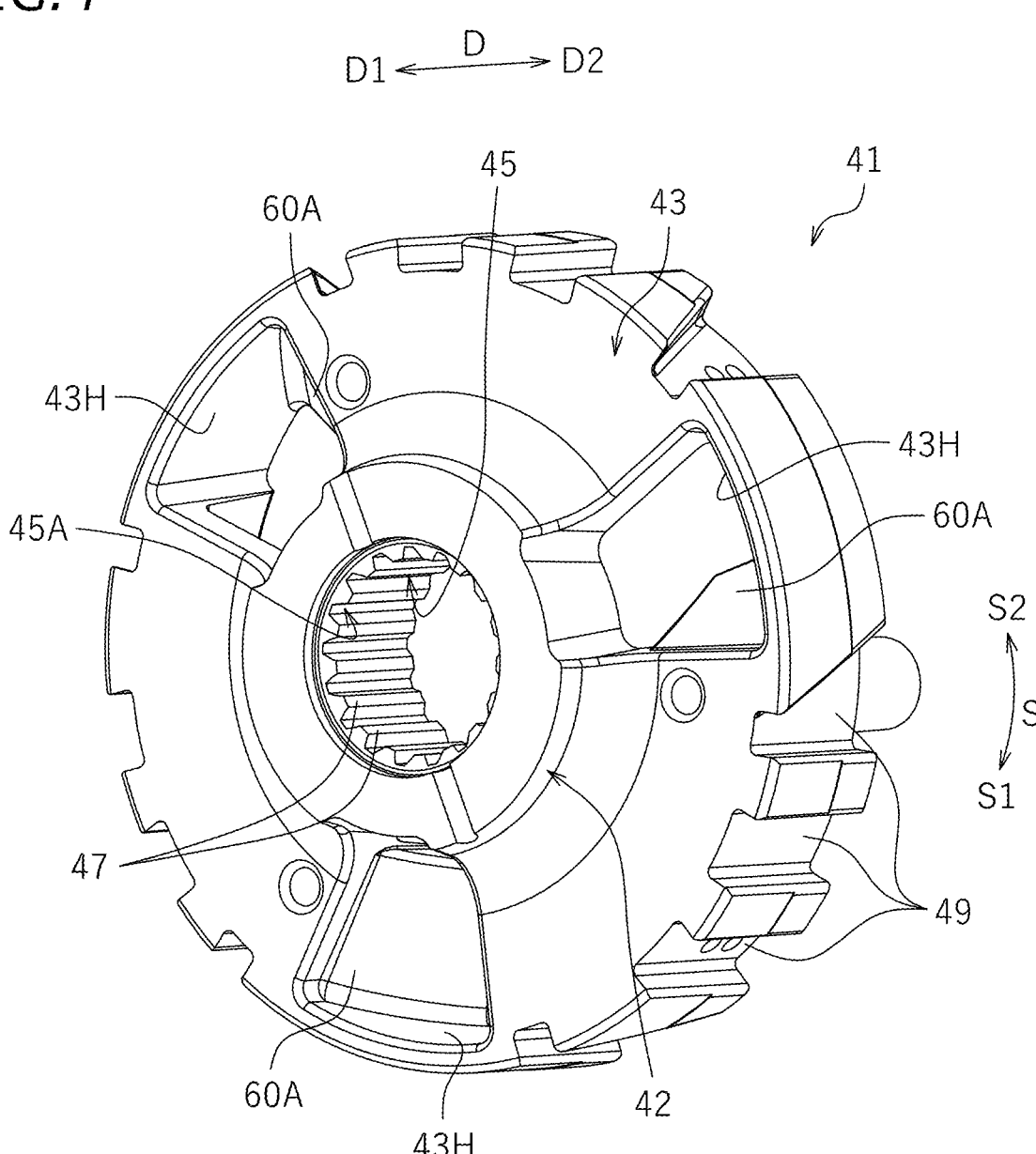
FIG. 4 is a perspective view of a first clutch center according to an example embodiment of the present invention.

As illustrated in FIGS. 3 and 4, the first clutch center 41 includes center-side cam holes 43H each passing through a portion of the base wall 43. The center-side cam holes 43H pass through the base wall 43 in the direction D. The center-side cam holes 43H are each located between adjacent ones of the center-side cam portions 60 in the circumferential direction S. As viewed in the axial direction of the clutch center 40, the center-side assist cam surfaces 60A and portions of the center-side cam holes 43H overlap with each other.

As illustrated in FIG. 3, the first clutch center 41 includes engaging grooves 49. The engaging grooves 49 are provided in an outer peripheral surface of the base wall 43. The engaging grooves 49 are recessed radially inward from the outer peripheral surface of the base wall 43.

Figure 2:
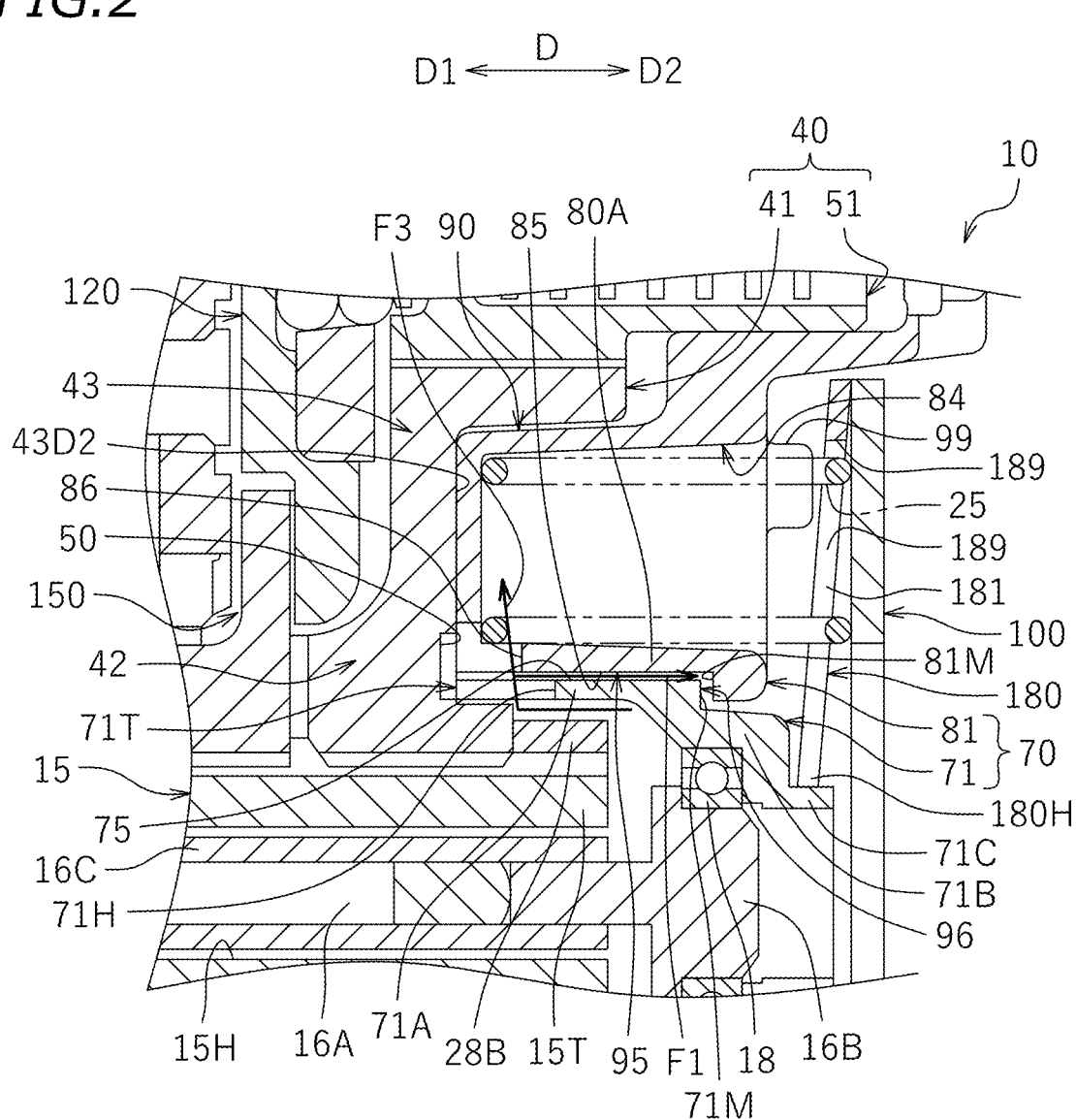
FIG. 2 is an enlarged cross-sectional view of a portion of a clutch apparatus according to an example embodiment of the present invention.

As illustrated in FIG. 3, the first clutch center 41 includes recesses 50 recessed in the first direction D1 from a surface of the first clutch center 41 located in the second direction D2 (which is the surface 43D2 of the base wall 43 located in the second direction D2 in this example embodiment). The recesses 50 each preferably have a circular shape in a plan view. The recesses 50, however, may each have any other desirable shape. In the present example embodiment, the number of recesses 50 included in the first clutch center 41 is three. The recesses 50 are provided at equal or substantially equal intervals in the circumferential direction S. The recesses 50 are each located between the output shaft holder 42 and the associated center-side cam portion 60 in a radial direction. The recesses 50 are positioned radially inward of the center-side slipper cam surfaces 60S. As illustrated in FIG. 2, the recesses 50 are each provided in a portion of the first clutch center 41 located adjacent to an open end 71T of the first pressure structure 71 (which will be described below). The recesses 50 are located in the first direction D1 relative to the open end 71T. The recesses 50 each serve as an oil passage through which clutch oil inside the first pressure structure 71 is guidable to a clearance 95 (which will be described below). Each recess 50 is an example of a first oil passage.

Figure 5:
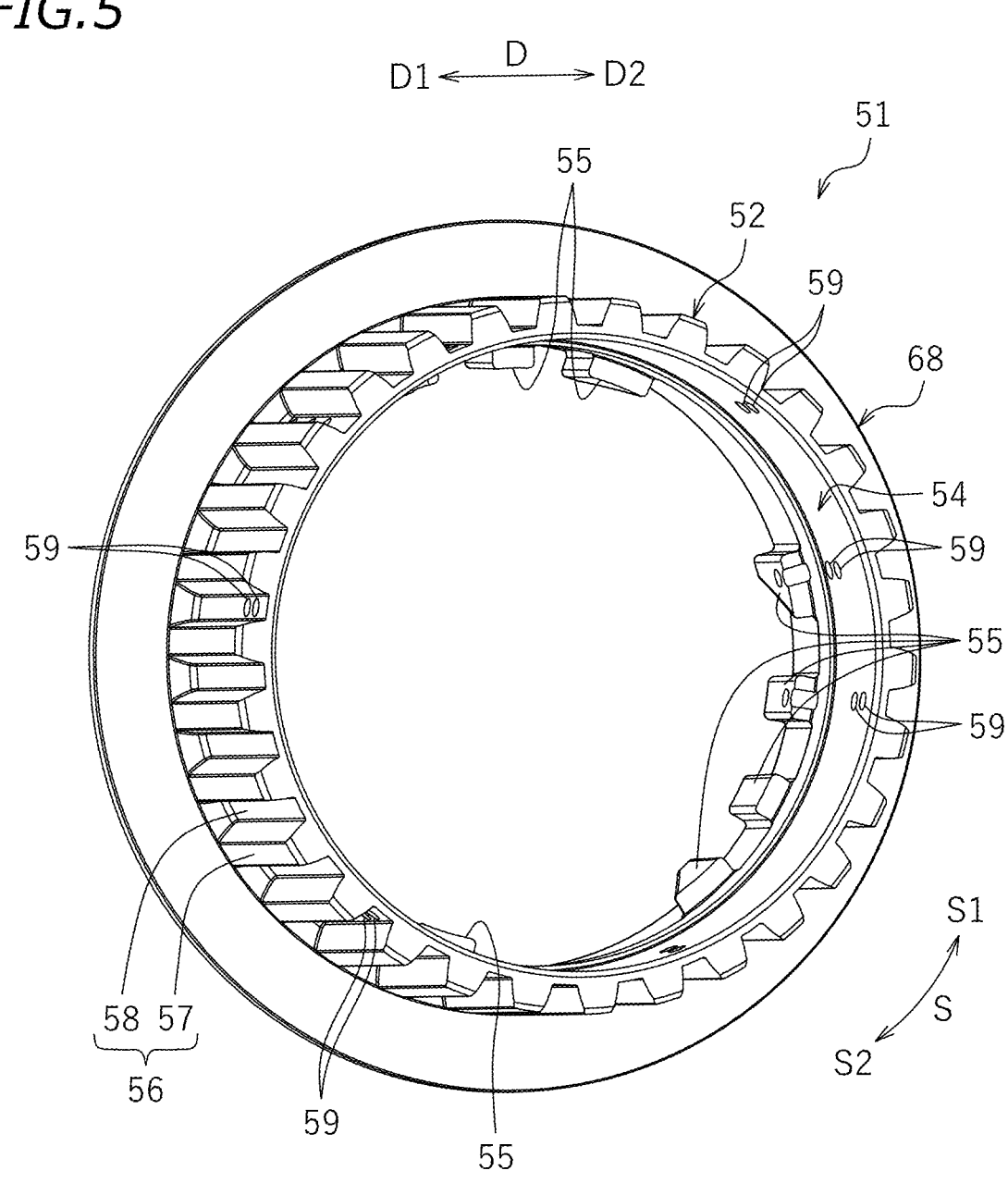
FIG. 5 is a perspective view of a second clutch center according to an example embodiment of the present invention.

As illustrated in FIG. 5, the second clutch center 51 preferably includes an annular outer peripheral wall 52, a flange 68 extending radially outward from the outer peripheral wall 52, and a center-side fitting portion 54. The second clutch center 51 holds the output-side rotary plates 22 alternately provided with the input-side rotary plates 20 in the direction D.

As illustrated in FIG. 5, an outer peripheral surface of the outer peripheral wall 52 is provided with a spline-fitting portion 56. The spline-fitting portion 56 preferably includes center-side fitting teeth 57 extending in an axial direction of the second clutch center 51 (i.e., the direction D) along the outer peripheral surface of the outer peripheral wall 52, spline grooves 58 provided between adjacent ones of the center-side fitting teeth 57 and extending in the axial direction of the second clutch center 51 (i.e., the direction D), and oil discharge holes 59. The center-side fitting teeth 57 hold the output-side rotary plates 22. The center-side fitting teeth 57 are arranged in the circumferential direction S. The center-side fitting teeth 57 are provided at equal or substantially equal intervals in the circumferential direction S. The center-side fitting teeth 57 are similar in shape. The center-side fitting teeth 57 protrude radially outward from the outer peripheral surface of the outer peripheral wall 52. The oil discharge holes 59 are each provided radially through the outer peripheral wall 52. The oil discharge holes 59 are each provided between adjacent ones of the center-side fitting teeth 57. In other words, the oil discharge holes 59 are provided in the spline grooves 58. The oil discharge holes 59 are provided in the center-side fitting portion 54. The oil discharge holes 59 allow communication between the inside and outside of the second clutch center 51. The oil discharge holes 59 are holes through which clutch oil or other fluid that has flowed out of the output shaft 15 into the clutch center 40 is discharged out of the clutch center 40. Clutch oil that has been discharged through the oil discharge holes 59 is supplied to the input-side rotary plates 20 and the output-side rotary plates 22 located radially outward of the oil discharge holes 59.

The output-side rotary plates 22 are held by the spline-fitting portion 56 of the second clutch center 51 and the pressure assembly 70. Portions of the output-side rotary plates 22 are held by the center-side fitting teeth 57 and the spline grooves 58 of the second clutch center 51 through spline-fitting. The other portions of the output-side rotary plates 22 are held by after-mentioned pressure-side fitting teeth 87 (see FIG. 7) of the pressure assembly 70. The output-side rotary plates 22 are movable in the axial direction of the clutch center 40 (i.e., the direction D). The output-side rotary plates 22 are rotatable together with the clutch center 40.

The output-side rotary plates 22 are components to be pushed against the input-side rotary plates 20. The output-side rotary plates 22 are annular flat plates. The output-side rotary plates 22 are each preferably formed by punching a thin plate made of an SPCC material into an annular shape, for example. The friction materials provided on the input-side rotary plates 20 may be provided on the output-side rotary plates 22 instead of being provided on the input-side rotary plates 20, or may be provided on both of the input-side rotary plates 20 and the output-side rotary plates 22.

As illustrated in FIG. 5, the center-side fitting portion 54 is provided on an inner peripheral surface of the outer peripheral wall 52. The center-side fitting portion 54 is externally fitted to an after-mentioned pressure-side fitting portion 88 (see FIG. 7) to be slidable thereon. The center-side fitting portion 54 has an inner diameter falling within a fitting tolerance that allows clutch oil flowing out of an extremity 15T (see FIG. 1) of the output shaft 15 to flow between the center-side fitting portion 54 and the pressure-side fitting portion 88. In other words, the center-side fitting portion 54 and the pressure-side fitting portion 88 have a gap therebetween.

Figure 6:
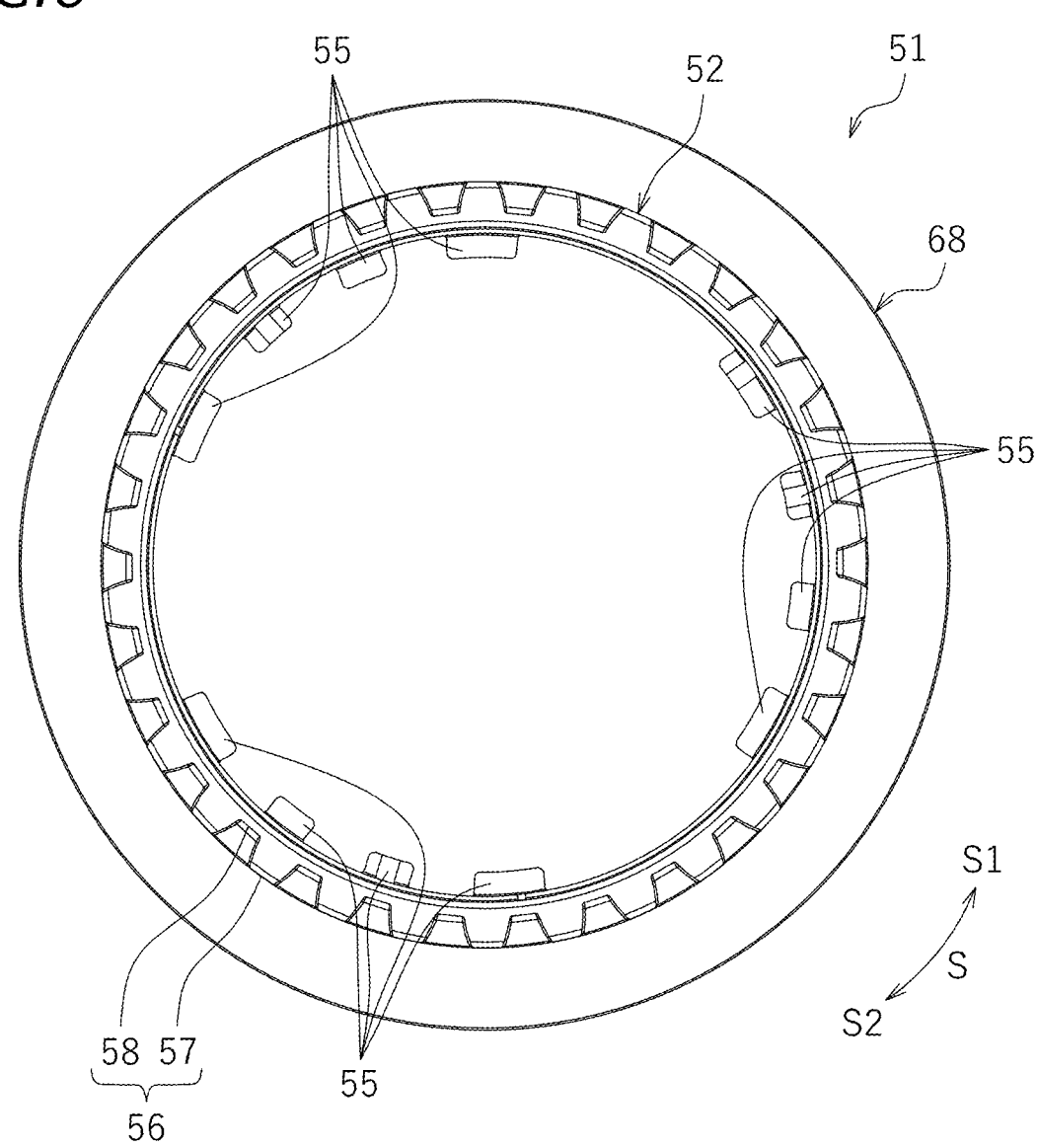
FIG. 6 is a plan view of a second clutch center according to an example embodiment of the present invention.

As illustrated in FIGS. 5 and 6, the second clutch center 51 includes engaging protrusions 55. The engaging protrusions 55 come into engagement with the engaging grooves 49 (see FIG. 3) of the first clutch center 41. The engaging protrusions 55 are provided on the inner peripheral surface of the outer peripheral wall 52. The engaging protrusions 55 protrude radially inward from the inner peripheral surface of the outer peripheral wall 52. The engaging protrusions 55 are located in the first direction D1 relative to the oil discharge holes 59.

Figure 7:
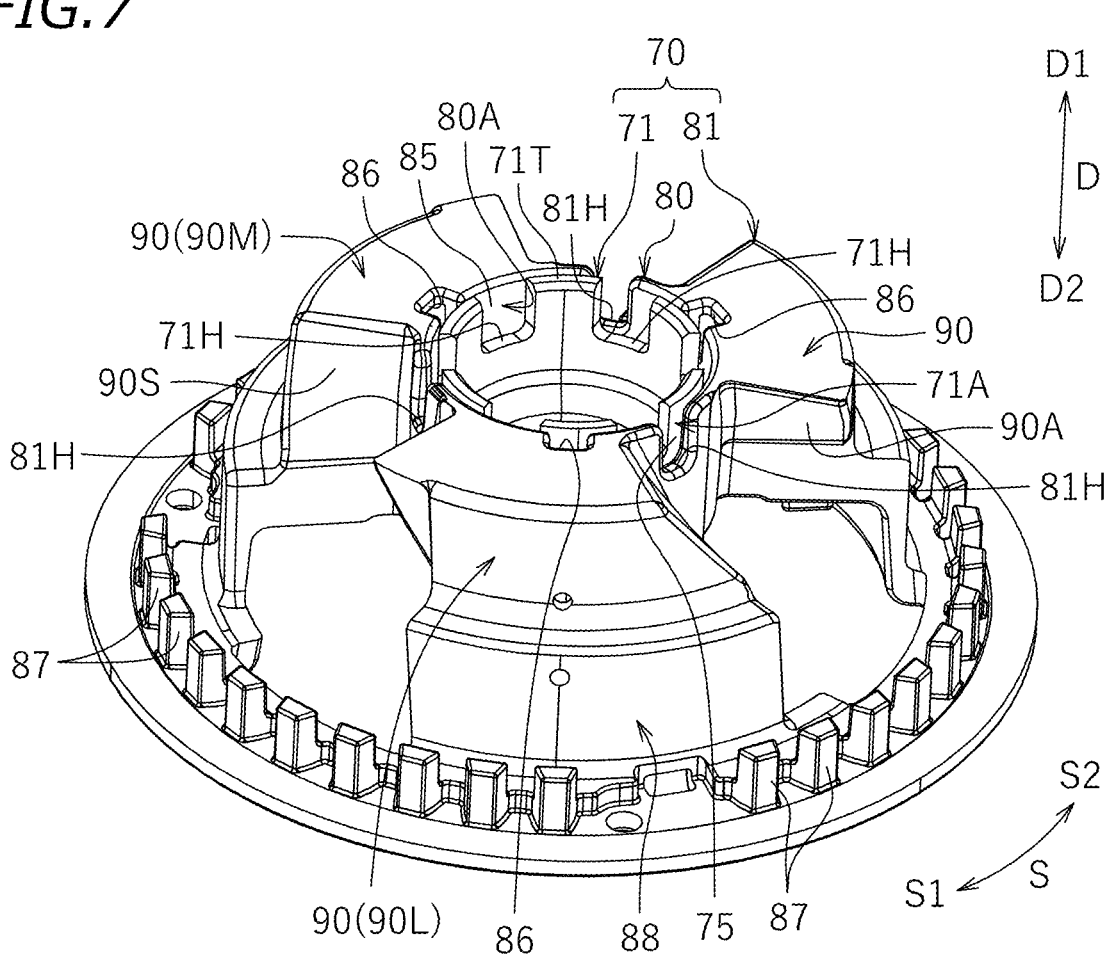
FIG. 7 is a perspective view of a pressure assembly according to an example embodiment of the present invention.

As illustrated in FIG. 1, the pressure assembly 70 is movable toward or away from the clutch center 40 and rotatable relative to the clutch center 40. The pressure assembly 70 is able to push the input-side rotary plates 20 and the output-side rotary plates 22. The pressure assembly 70 is positioned concentrically with the clutch center 40 and the clutch housing 30. As illustrated in FIG. 7, the pressure assembly 70 includes the first pressure structure 71 and a second pressure structure 81. The first pressure structure 71 and the second pressure structure 81 are assembled to each other. The second pressure structure 81 is located radially outward of the first pressure structure 71. The second pressure structure 81 is externally fitted to the first pressure structure 71. The first pressure structure 71 and the second pressure structure 81 are movable relative to each other in the direction D. The first pressure structure 71 and the second pressure structure 81 are rotatable relative to each other within a predetermined angular range in the circumferential direction S. As used herein, the phrase "within a predetermined angular range" refers to being within an angular range in which the first pressure structure 71 and the second pressure structure 81 rotate from a state illustrated in FIG. 12A (i.e., a state in which after-mentioned pressure-side assist cam surfaces 90A and the center-side assist cam surfaces 60A are in contact with each other) to a state illustrated in FIG. 12B (or more specifically, a state in which after-mentioned pressure-side slipper cam surfaces 90S and the center-side slipper cam surfaces 60S are in contact with each other, and the second pressure structure 81 is in abutment with the stopper plate 100). The first pressure structure 71 is movable relative to the second pressure structure 81 in the direction D. As described above, the pressure assembly 70 includes the first pressure structure 71 and the second pressure structure 81 that are able to move (or rotate) independently of each other.

Figure 8:
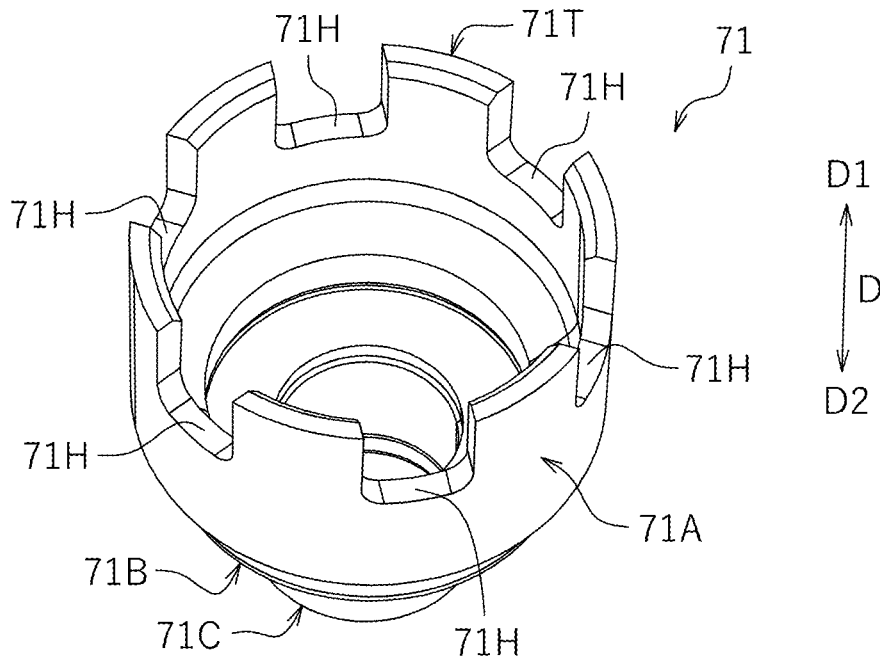
FIG. 8 is a perspective view of a first pressure structure according to an example embodiment of the present invention.
Figure 9:
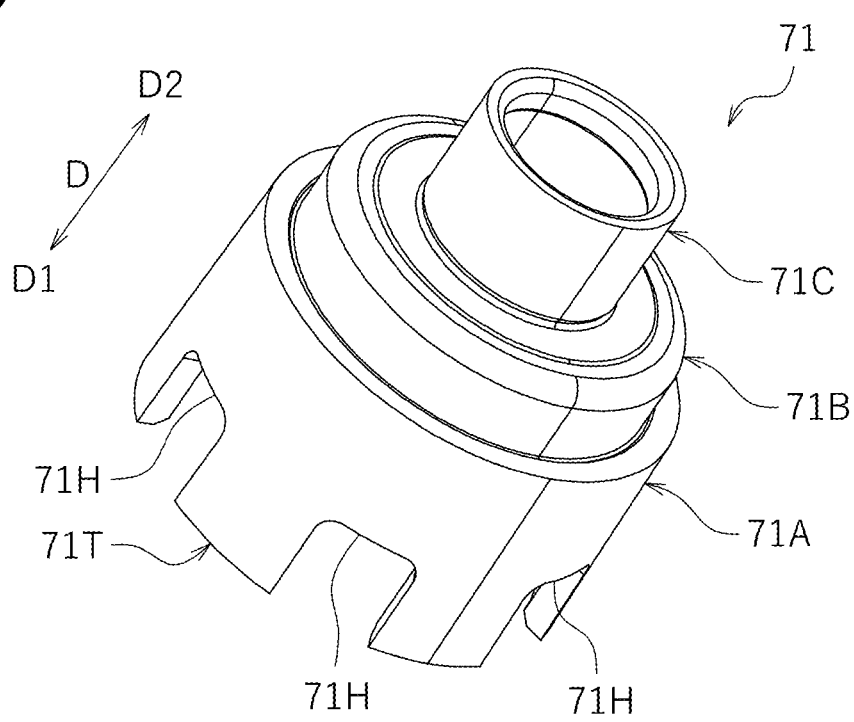
FIG. 9 is a perspective view of a first pressure structure according to an example embodiment of the present invention.

As illustrated in FIGS. 8 and 9, the first pressure structure 71 has a tubular shape. The first pressure structure 71 is externally fitted to the output shaft holder 42 (see FIG. 1).

The first pressure structure 71 houses the extremity 15T (see FIG. 1) of the output shaft 15. The release bearing 18 (see FIG. 1) is housed in the first pressure structure 71. The first pressure structure 71 is configured to receive a pushing force from the pusher 16B (see FIG. 1). The first pressure structure 71 is movable in the second direction D2 in response to a clutch operation (which includes, for example, a clutch lever operation and/or a button operation). The first pressure structure 71 is configured to receive clutch oil that has flowed out of the extremity 15T of the output shaft 15. The first pressure structure 71 preferably includes a tubular first portion 71A to be externally fitted to the output shaft holder 42, a tubular second portion 71B continuous with the first portion 71A and smaller in diameter than the first portion 71A, and a tubular third portion 71C continuous with the second portion 71B and smaller in diameter than the second portion 71B. As illustrated in FIG. 2, the first portion 71A includes an opening directed in the first direction D1. The open end 71T of the first pressure structure 71 is included in the first portion 71A. The open end 71T comes into contact with the surface 43D2 of the base wall 43 located in the second direction D2. The open end 71T is located in the second direction D2 relative to the recesses 50. Externally fitting the first portion 71A to the output shaft holder 42 determines positioning of the pressure assembly 70 with respect to the clutch center 40. The release bearing 18 is provided inward of the second portion 71B. The second portion 71B holds the release bearing 18. The third portion 71C includes an opening directed in the second direction D2. Alternatively, the third portion 71C may include no opening directed in the second direction D2 and may thus be closed. The disc spring 180 is retained by the third portion 71C.

As illustrated in FIGS. 8 and 9, the first pressure structure 71 includes first cut-outs 71H through which the clutch oil inside the first pressure structure 71 is guidable out of the first pressure structure 71. Each first cut-out 71H is an example of the first oil passage. Through the first cut-outs 71H, the clutch oil inside the first pressure structure 71 is guidable to the clearance 95 and second cut-outs 81H (see FIG. 10), which will be described below. The first cut-outs 71H are provided in the open end 71T of the first pressure structure 71. The first cut-outs 71H are recessed in the second direction D2 from the open end 71T. More than one first cut-out 71H is provided in a circumferential direction of the open end 71T. In the present example embodiment, the number of first cut-outs 71H is preferably six. The first cut-outs 71H are provided at equal or substantially equal intervals in the circumferential direction S. As illustrated in FIG. 1, an end of each first cut-out 71H situated in the second direction D2 is located in the second direction D2 relative to an end of the output shaft holder 42 situated in the second direction D2.

Figure 10:
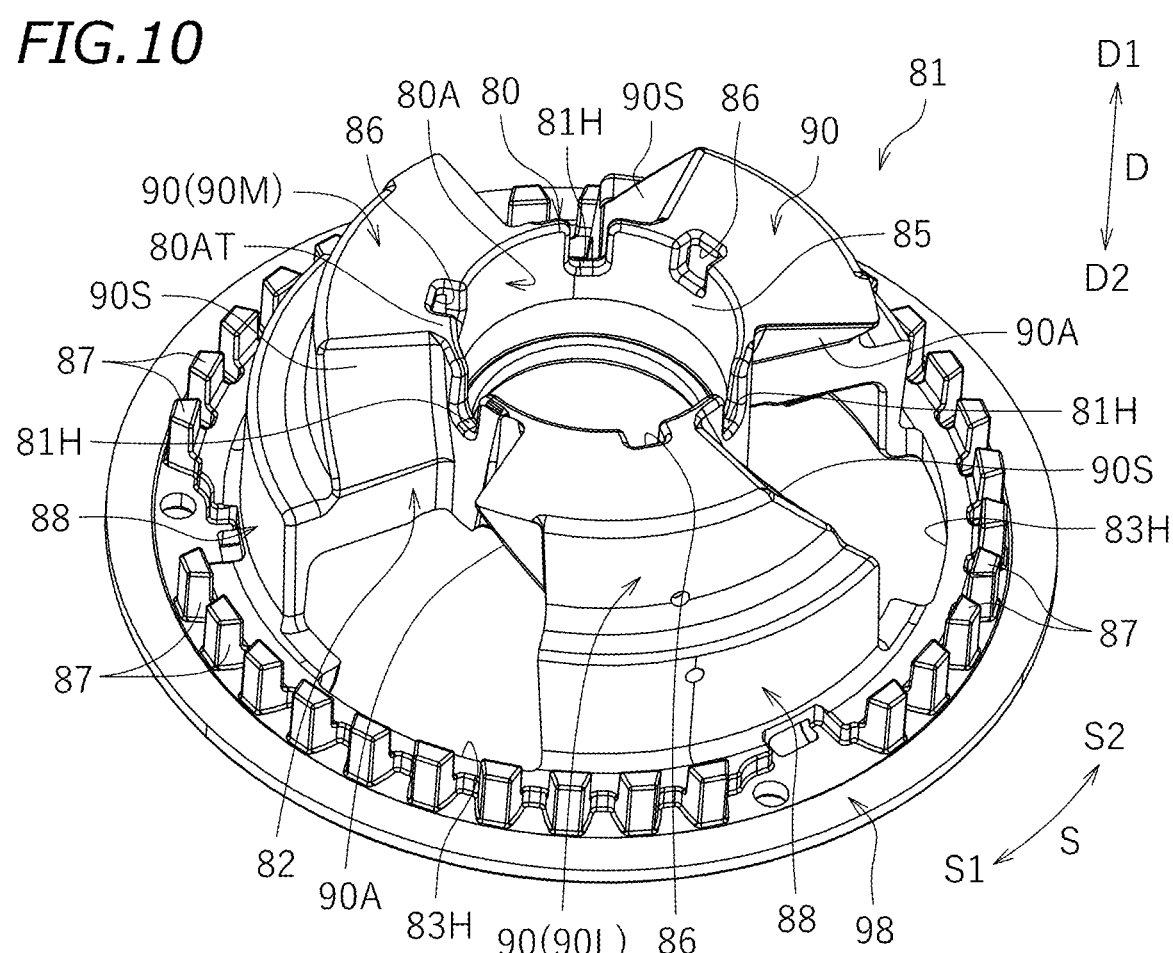
FIG. 10 is a perspective view of a second pressure structure according to an example embodiment of the present invention.

As illustrated in FIG. 1, the second pressure structure 81 is movable in the second direction D2 upon being pushed by the first pressure structure 71. The second pressure structure 81 is internally fitted to the second clutch center 51. This determines positioning of the second pressure structure 81 in a radial direction. The second pressure structure 81 is slidable relative to the second clutch center 51 in the direction D. The second pressure structure 81 and the second clutch center 51 are rotatable relative to each other in the circumferential direction S. As illustrated in FIG. 10, the second pressure structure 81 includes a body 82 and a flange 98 connected to an outer peripheral edge of the body 82, which is located in the second direction D2, and extending radially outward. The body 82 protrudes in the first direction D1 relative to the flange 98. The flange 98 is located radially outward of a tubular portion 80 (which will be described below). The second pressure structure 81 holds the output-side rotary plates 22 alternately provided with the input-side rotary plates 20. The flange 98 is able to push the input-side rotary plates 20 and the output-side rotary plates 22.

Figure 11:
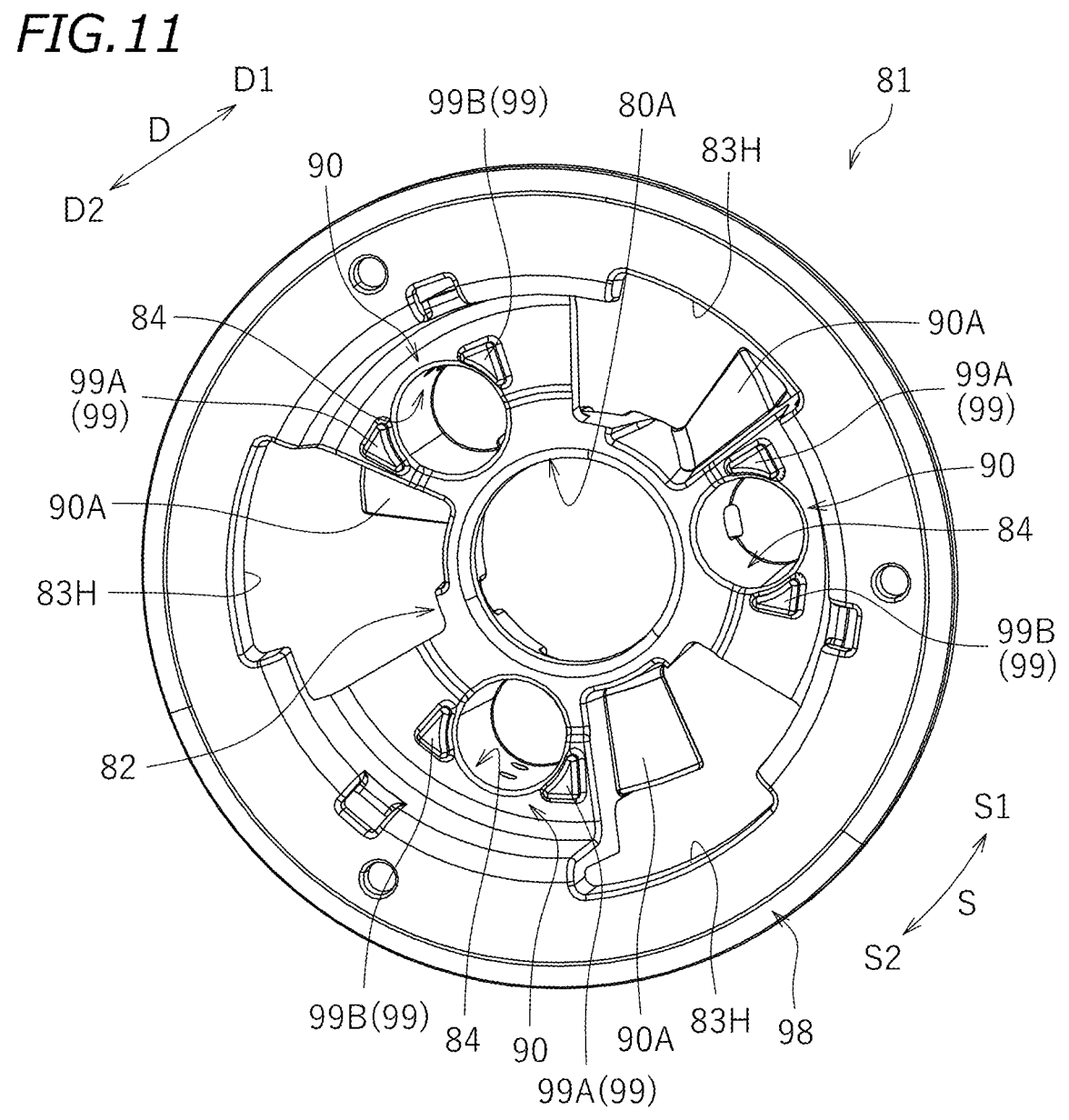

As illustrated in FIG. 10, the body 82 includes the tubular portion 80, the pressure-side cam portions 90, the pressure-side fitting portion 88, and spring housing portions 84 (see FIG. 11).

As illustrated in FIG. 10, the tubular portion 80 includes a tubular defining wall 80A. The tubular portion 80 is preferably integral with the pressure-side cam portions 90. The pressure-side cam portions 90 are located radially outward of the defining wall 80A. As illustrated in FIG. 7, the first pressure structure 71 is housed in the tubular portion 80. An inner peripheral surface 85 of the defining wall 80A is slidable in the direction D relative to an outer peripheral surface 75 of the first portion 71A of the first pressure structure 71.

As illustrated in FIG. 2, the pressure assembly 70 includes the clearance 95 defined between the outer peripheral surface 75 of a portion of the first pressure structure 71, which includes the open end 71T adjacent to the clutch center 40 (or more specifically, the first clutch center 41), and the inner peripheral surface 85 of the defining wall 80A of the second pressure structure 81, which is externally fitted to the outer peripheral surface 75. In other words, a gap through which clutch oil is allowed to flow is defined between the outer peripheral surface 75 and the inner peripheral surface 85. Clutch oil inside the first pressure structure 71 is guided to the clearance 95 through the recesses 50 of the first clutch center 41 and/or the first cut-outs 71H of the first pressure structure 71. Clutch oil is retained in the clearance 95. The clearance 95 includes an opening directed in the first direction D1 and an opening directed in the second direction D2. The open end 71T is located in the first direction D1 relative to the clearance 95. The disc spring 180 is located in the second direction D2 relative to the clearance 95. The clutch oil retained in the clearance 95 flows, for example, in the second direction D2, with the result that the clutch oil flows out of an open end 95H (see FIG. 1) of the clearance 95 located in the second direction D2 and is thus supplied to the disc spring 180 through an oil supply passage 96 (which will be described below).

As illustrated in FIG. 2, the pressure assembly 70 includes the oil supply passage 96 defined between the first pressure structure 71 and the second pressure structure 81. The oil supply passage 96 is defined between a first wall surface 71M of the first pressure structure 71 and a second wall surface 81M of the second pressure structure 81. Outer surfaces of the second and third portions 71B and 71C of the first pressure structure 71 define a portion of the oil supply passage 96. The first wall surface 71M and the second wall surface 81M extend in a radial direction of the output shaft 15. The second wall surface 81M opposes the first wall surface 71M. The first wall surface 71M is provided such that the first wall surface 71M is able to come into contact with the second wall surface 81M. When the first wall surface 71M and the second wall surface 81M are in contact with each other, the first wall surface 71M and the second wall surface 81M may slide in the circumferential direction S. The oil supply passage 96 is in communication with the open end 95H (see FIG. 1) of the clearance 95 located in the second direction D2. The oil supply passage 96 extends in the radial direction of the output shaft 15. Through the oil supply passage 96, clutch oil that has flowed out of the clearance 95 is guided to the disc spring 180 (e.g., sliding regions of the disc spring 180 and the third portion 71C of the first pressure structure 71) along the outer surfaces of the second and third portions 71B and 71C of the first pressure structure 71.

When the clutch lever is operated by a driver of the motorcycle in a clutch ON state, the pusher 16B that has been pushed by the push rod 16A pushes the first pressure structure 71 in the second direction D2 against an urging force of the disc spring 180. In this case, the first wall surface 71M of the first pressure structure 71 and the second wall surface 81M of the second pressure structure 81 come into contact with each other, so that the first pressure structure 71 pushes the second pressure structure 81 in the second direction D2. The second pressure structure 81 thus moves in a direction away from the clutch center 40 or, more specifically, the second clutch center 51 (i.e., in the second direction D2) against an urging force of clutch springs 25. This brings the clutch center 40 to a clutch OFF state (i.e., a clutch-disengaged state) in which the input-side rotary plates 20 and the output-side rotary plates 22 are released from being frictionally connected to each other, with the result that rotational driving of the clutch center 40 is damped or stopped. In other words, transmission of the rotational driving force of the engine to the clutch center 40 is cut off. Accordingly, the oil supply passage 96 is closed in the clutch OFF state. The oil supply passage 96 is open in the clutch ON state. When the oil supply passage 96 is open, clutch oil is supplied to regions of the first wall surface 71M and the second wall surface 81M that come into contact with each other. During switching from the clutch ON state to the clutch OFF state or during switching from the clutch OFF state to the clutch ON state, the first wall surface 71M and the second wall surface 81M slide. In this case, clutch oil is supplied through the oil supply passage 96 to portions of the first wall surface 71M and the second wall surface 81M in contact with each other (i.e., a region of contact between the first wall surface 71M and the second pressure structure 81). Accordingly, the first wall surface 71M and the second wall surface 81M would be prevented from being worn if the first wall surface 71M and the second wall surface 81M slide.

As illustrated in FIG. 10, the second pressure structure 81 includes the second cut-outs 81H through which clutch oil is guidable out of the second pressure structure 81. Through the second cut-outs 81H, clutch oil that has been guided to the clearance 95, for example, is guidable out of the second pressure structure 81. Each second cut-out 81H is an example of a second oil passage. Through the second cut-outs 81H, clutch oil inside the clearance 95 and/or the first pressure structure 71 is guidable to, for example, the pressure-side assist cam surfaces 90A, the pressure-side slipper cam surfaces 90S, the center-side assist cam surfaces 60A, and the center-side slipper cam surfaces 60S (which will be described below). The second cut-outs 81H are provided in the defining wall 80A of the tubular portion 80. The second cut-outs 81H are recessed in the second direction D2 from an end 80AT of the defining wall 80A located in the first direction D1. More than one second cut-out 81H is provided in the circumferential direction S of the second pressure structure 81 (or more specifically, the circumferential direction S of the defining wall 80A). In the present example embodiment, the number of second cut-outs 81H is three. The second cut-outs 81H are provided at equal or substantially equal intervals in the circumferential direction S. The second cut-outs 81H are each located between adjacent ones of the pressure-side cam portions 90 in the circumferential direction. As illustrated in FIG. 7, the second cut-outs 81H are provided in portions of the second pressure structure 81 located outward of the open end 71T of the first pressure structure 71 in the radial direction of the output shaft 15. As illustrated in FIG. 1, an end of each second cut-out 81H situated in the second direction D2 is located in the second direction D2 relative to the end of the output shaft holder 42 situated in the second direction D2.

As illustrated in FIGS. 1 and 7, at least portions of the first cut-outs 71H overlap with the second cut-outs 81H as viewed in the radial direction of the output shaft 15. When the first pressure structure 71 and the second pressure structure 81 rotate relative to each other in the circumferential direction S, the first cut-outs 71H and the second cut-outs 81H overlap with each other as viewed in the radial direction of the output shaft 15. The first cut-outs 71H are longer in length in the circumferential direction S than the second cut-outs 81H.

The pressure-side cam portions 90 are each in the shape of a block with cam surfaces that are inclined surfaces included in an assist & slipper (registered trademark) mechanism, which slides relative to the center-side cam portions 60 (see, for example, FIG. 3) to produce an assist torque or a slipper torque. As illustrated in FIG. 10, the pressure-side cam portions 90 protrude in the first direction D1 relative to the flange 98. The pressure-side cam portions 90 are provided at equal or substantially equal intervals in the circumferential direction S of the second pressure structure 81. In the present example embodiment, the number of pressure-side cam portions 90 included in the second pressure structure 81 is three. The number of pressure-side cam portions 90, however, is not limited to three.

As illustrated in FIG. 10, the pressure-side cam portions 90 are located radially outward of the tubular portion 80. The pressure-side cam portions 90 include the pressure-side assist cam surfaces 90A (see also FIG. 11) and the pressure-side slipper cam surfaces 90S. The pressure-side assist cam surfaces 90A are able to come into contact with the center-side assist cam surfaces 60A. The pressure-side assist cam surfaces 90A are configured to, upon being rotated relative to the clutch center 40, produce a force in a direction in which the pressure assembly 70 is moved toward the clutch center 40 in order to increase the pushing force (or pressing force) for the input-side rotary plates 20 and the output-side rotary plates 22. The pressure-side slipper cam surfaces 90S are able to come into contact with the center-side slipper cam surfaces 60S. The pressure-side slipper cam surfaces 90S are configured to, upon being rotated relative to the clutch center 40, move the pressure assembly 70 away from the clutch center 40 in order to reduce the pushing force (or pressing force) for the input-side rotary plates 20 and the output-side rotary plates 22. The pressure-side assist cam surface 90A of a first pressure-side cam portion 90L, which is one of the pressure-side cam portions 90 adjacent to each other in the circumferential direction S, and the pressure-side slipper cam surface 90S of a second pressure-side cam portion 90M, which is another one of the pressure-side cam portions 90 adjacent to each other in the circumferential direction S, face each other in the circumferential direction S.

Figure 12A:
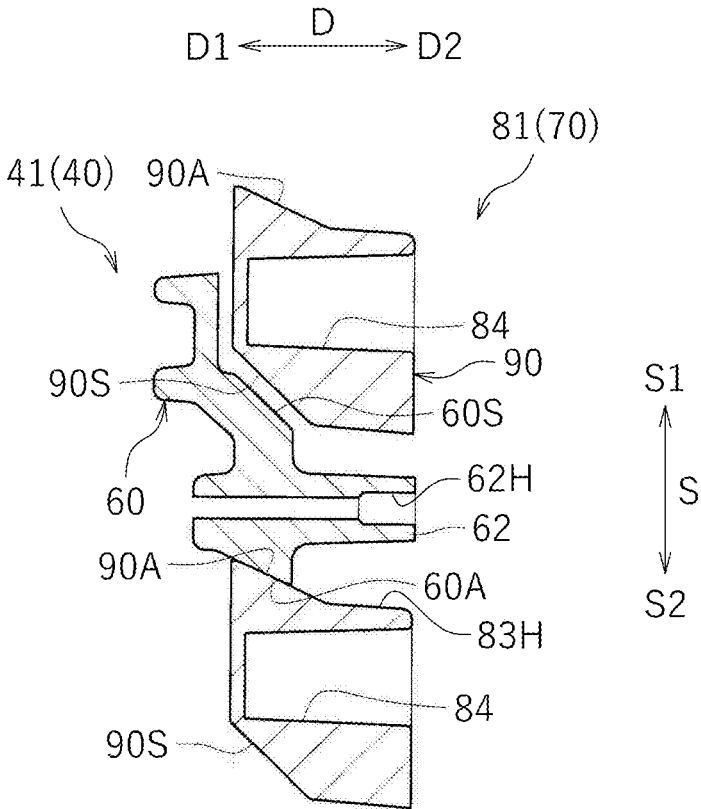
FIG. 12A is a schematic diagram illustrating actions of a center-side assist cam surface and a pressure-side assist cam surface.

Actions of the center-side cam portions 60 and the pressure-side cam portions 90 will be described below. When the engine is increased in rotational speed such that a rotational driving force input to the input gear 35 and the clutch housing 30 is transmittable to the output shaft 15 through the clutch center 40, a rotational force is applied to the pressure assembly 70 in the first circumferential direction S1 as illustrated in FIG. 12A. Thus, actions of the center-side assist cam surfaces 60A and the pressure-side assist cam surfaces 90A apply a force to the pressure assembly 70 in the first direction D1. This increases the pressing force of the input-side rotary plates 20 and the output-side rotary plates 22.

Figure 12B:
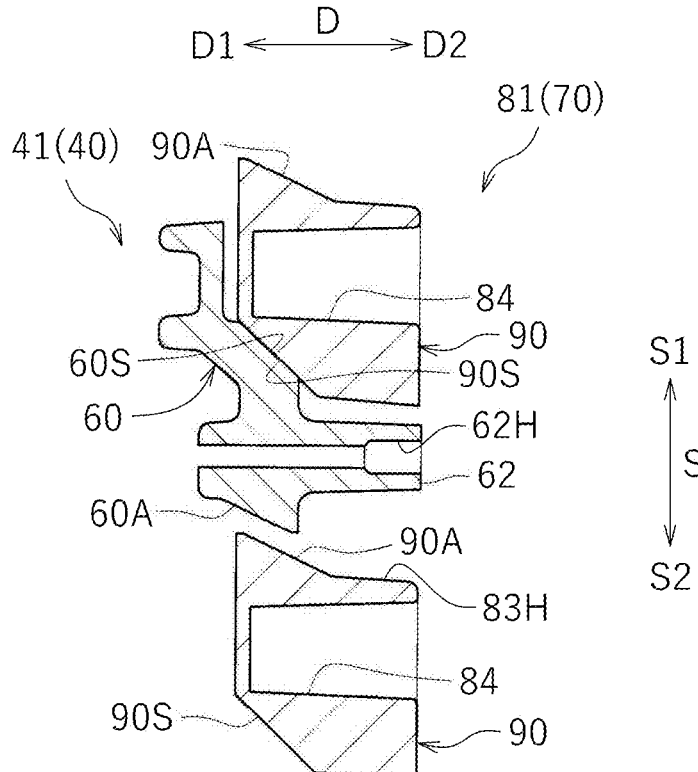
FIG. 12B is a schematic diagram illustrating actions of a center-side slipper cam surface and a pressure-side slipper cam surface.

When the output shaft 15 is higher in rotational speed than the input gear 35 and the clutch housing 30 such that a back torque is produced, a rotational force is applied to the clutch center 40 in the first circumferential direction S1 as illustrated in FIG. 12B. Thus, actions of the center-side slipper cam surfaces 60S and the pressure-side slipper cam surfaces 90S move the pressure assembly 70 in the second direction D2 to release the pressing force of the input-side rotary plates 20 and the output-side rotary plates 22. This makes it possible to prevent the engine and/or the transmission from malfunctioning due to the back torque. The application of the rotational force to the clutch center 40 in the first circumferential direction S1 causes the first pressure structure 71 and the second pressure structure 81 to rotate relative to each other in the circumferential direction S.

As illustrated in FIG. 10, the pressure-side fitting portion 88 is located radially outward of the pressure-side cam portions 90. The pressure-side fitting portion 88 is located in the second direction D2 relative to the pressure-side cam portions 90. The pressure-side fitting portion 88 is internally fitted to the center-side fitting portion 54 (see FIG. 5) to be slidable thereon.

As illustrated in FIGS. 10 and 11, the second pressure structure 81 includes pressure-side cam holes 83H passing through portions of the body 82 and the flange 98. The pressure-side cam holes 83H are located radially outward of the tubular portion 80. The pressure-side cam holes 83H each extend radially outward of the pressure-side fitting portion 88 from a position laterally of the tubular portion 80. The pressure-side cam holes 83H are provided between pressure-side assist cam surfaces 90A and the pressure-side slipper cam surfaces 90S of the pressure-side cam portions 90 adjacent to each other. As viewed in an axial direction of the second pressure structure 81, the pressure-side assist cam surfaces 90A and portions of the pressure-side cam holes 83H overlap with each other. The bosses 62 (see FIG. 3) of the first clutch center 41 are inserted into the pressure-side cam holes 83H. The bosses 62 pass through the pressure-side cam holes 83H. Each pressure-side cam hole 83H is an example of a through hole.

As illustrated in FIG. 10, the second pressure structure 81 includes the pressure-side fitting teeth 87 provided on the flange 98. The pressure-side fitting teeth 87 hold the output-side rotary plates 22. The pressure-side fitting teeth 87 protrude in the first direction D1 from the flange 98. The pressure-side fitting teeth 87 are located radially outward of the tubular portion 80. The pressure-side fitting teeth 87 are located radially outward of the pressure-side cam portions 90. The pressure-side fitting teeth 87 are located radially outward of the pressure-side fitting portion 88. The pressure-side fitting teeth 87 are arranged in the circumferential direction S. The pressure-side fitting teeth 87 can preferably be provided at equal or substantially equal intervals in the circumferential direction S. In the present example embodiment, not all of the pressure-side fitting teeth 87 are provided at equal or substantially equal intervals, but some of the pressure-side fitting teeth 87 are provided at larger intervals than the other pressure-side fitting teeth 87 adjacent to each other and provided at equal or substantially equal intervals.

As illustrated in FIG. 1, the spring housing portions 84 are provided in the pressure-side cam portions 90 (see also FIG. 11). The spring housing portions 84 are located radially outward of the defining wall 80A of the tubular portion 80.

The spring housing portions 84 are recessed in the first direction D1 from the second direction D2 (see also FIG. 12A). The spring housing portions 84 each have a circular shape. The spring housing portions 84 house the clutch springs 25. Each spring housing portion is an example of a housing portion.

As illustrated in FIG. 1, the clutch springs 25 are housed in the spring housing portions 84. An end of each clutch spring 25 located in the first direction D1 is in abutment with the second pressure structure 81. An end of each clutch spring 25 located in the second direction D2 is in abutment with the stopper plate 100. The clutch springs 25 urge the pressure assembly 70 (or more specifically, the second pressure structure 81) toward the clutch center 40 (i.e., in the first direction D1). The clutch springs 25 are, for example, coil springs provided by spirally winding spring steel. The clutch springs 25 extend in the direction D.

Figure 15:
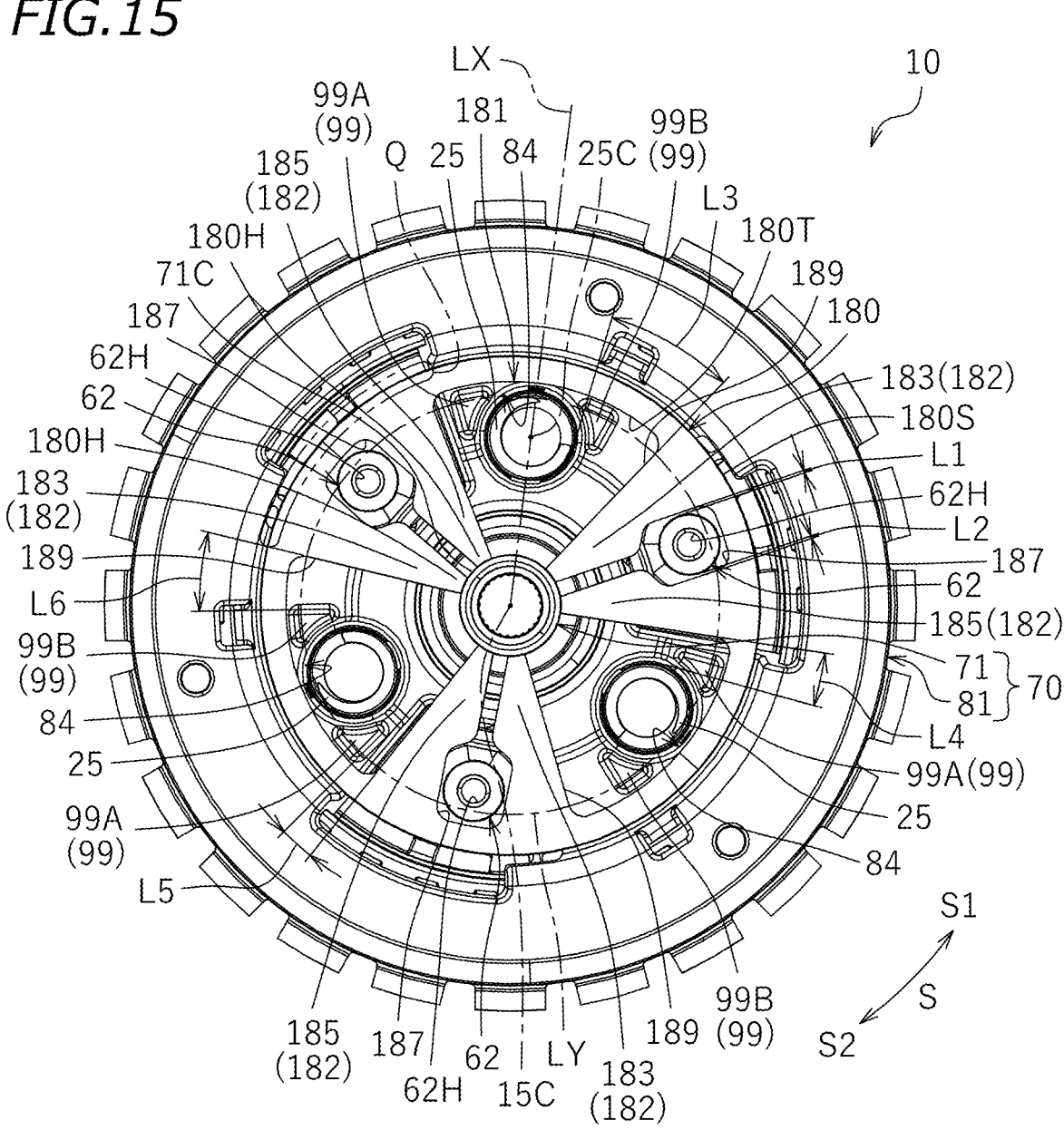
FIG. 15 is a plan view of a clutch apparatus according to an example embodiment of the present invention.

As illustrated in FIG. 11, the second pressure structure 81 includes stoppers 99 (see also FIG. 2) extending in the second direction D2. The stoppers 99 are able to contact the stopper plate 100. As illustrated in FIG. 15, the stoppers 99 each preferably have a triangular or a substantially triangular shape in a plan view. The stoppers 99 each preferably have a triangular or substantially triangular prismatic shape. Each stopper 99 includes a first stopper 99A provided on a first side in the circumferential direction S relative to the associated clutch spring 25 (i.e., provided in the first circumferential direction S1 relative to the associated clutch spring 25), and a second stopper 99B provided on a second side in the circumferential direction S relative to the associated clutch spring 25 (i.e., provided in the second circumferential direction S2 relative to the associated clutch spring 25). The spring housing portions 84 are each located between the associated first stopper 99A and the associated second stopper 99B in the circumferential direction S. The first stoppers 99A are adjacent to the pressure-side assist cam surfaces 90A. The second stoppers 99B are adjacent to the pressure-side slipper cam surfaces 90S. As viewed in the radial direction of the output shaft 15, at least a portion of each first stopper 99A overlaps with the associated clutch spring 25. As viewed in the radial direction of the output shaft 15, at least a portion of each second stopper 99B overlaps with the associated clutch spring 25.

As illustrated in FIG. 10, the second pressure structure 81 includes through holes 86 through which clutch oil that has been guided to the clearance 95 is guidable to the spring housing portions 84. Each through hole 86 is an example of the second oil passage. The through holes 86 allow communication between the clearance 95 and the spring housing portions 84. Through the through holes 86, the clutch oil inside the clearance 95 and/or the first pressure structure 71 is guidable to, for example, the clutch springs 25. The through holes 86 are provided in the defining wall 80A of the tubular portion 80. The through holes 86 are provided to extend from the defining wall 80A of the tubular portion 80 to the pressure-side cam portions 90. The through holes 86 pass through portions of the defining wall 80A and the pressure-side cam portions 90. More than one through hole 86 is provided in a circumferential direction of the defining wall 80A. In the present example embodiment, the number of through holes 86 is preferably three, for example. The through holes 86 are provided at equal or substantially equal intervals in the circumferential direction S. Each of the through holes 86 is provided in an associated one of the pressure-side cam portions 90. The through holes 86 are each located between adjacent ones of the second cut-outs 81H in the circumferential direction S.

A predetermined amount of clutch oil is supplied into the clutch apparatus 10. The cutch oil prevents or reduces heat absorption and/or wearing of the friction materials. The clutch apparatus 10 according to the present example embodiment is a "wet multiplate friction clutch apparatus". The clutch oil flows into the first pressure structure 71 through the oil flow passage 15H of the output shaft 15. As indicated by an arrow F1 in FIG. 2, the clutch oil inside the first pressure structure 71 flows into the clearance 95 through the first cut-outs 71H. Some of the clutch oil retained in the clearance 95 is preferably supplied to, for example, the disc spring 180 through the oil supply passage 96. As indicated by an arrow F2 in FIG. 1, the clutch oil inside the first pressure structure 71 flows out of the second pressure structure 81 through the first cut-outs 71H and the second cut-outs 81H. The clutch oil that has flowed out of the second pressure structure 81 is supplied to, for example, the center-side cam portions 60, the pressure-side cam portions 90, the input-side rotary plates 20, and the output-side rotary plates 22. As indicated by an arrow F3 in FIG. 2, the clutch oil inside the first pressure structure 71 flows into the spring housing portions 84 through the first cut-outs 71H, the clearance 95, and the through holes 86. The clutch oil that has flowed into the spring housing portions 84 is supplied to the clutch springs 25 and/or the disc spring 180. The clutch oil inside the first pressure structure 71 is guided to, for example, the clearance 95 through the recesses 50.

Figure 13:
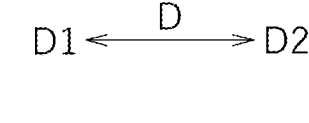
FIG. 13 is a cross-sectional view of a centrifugal clutch mechanism according to an example embodiment of the present invention.
Figure 13:
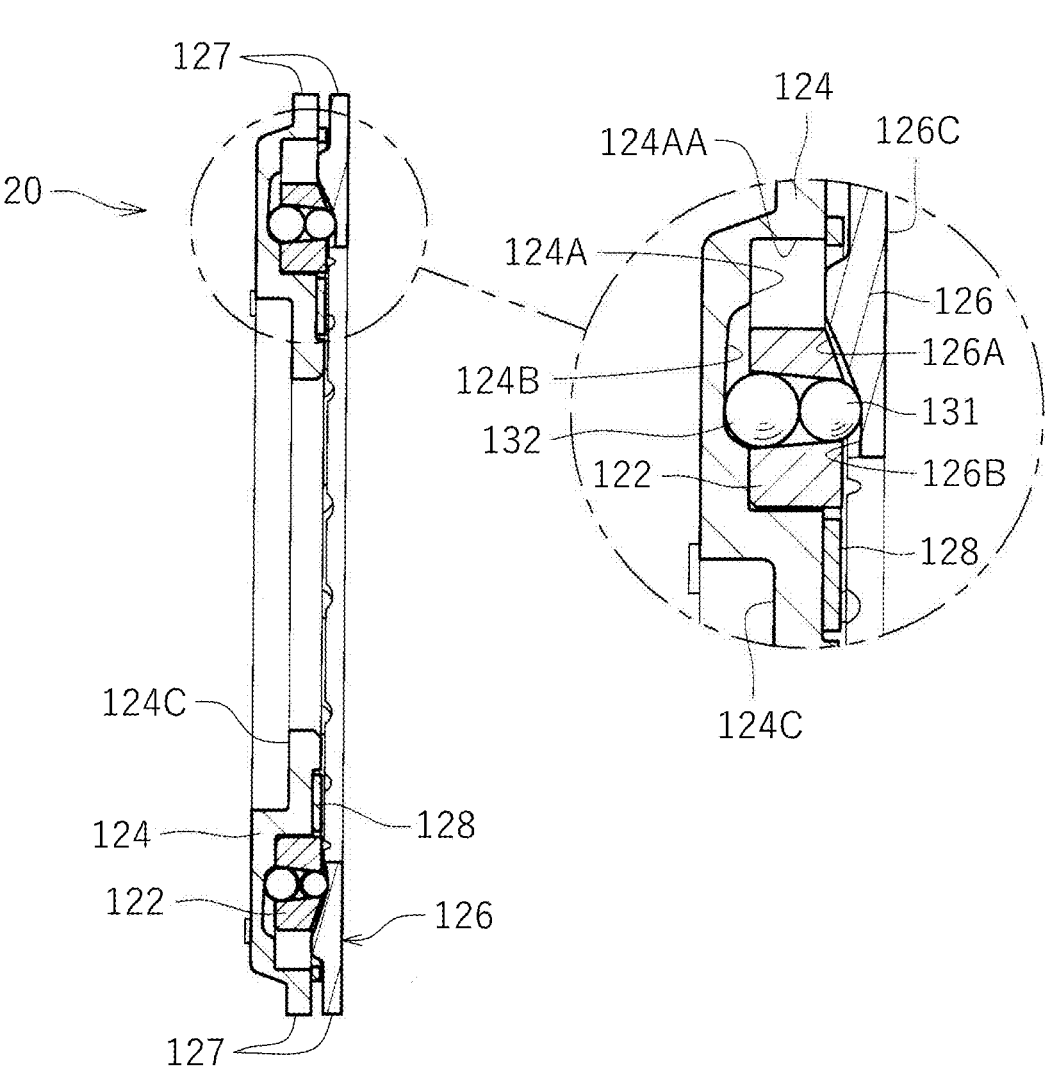
Figure 14:
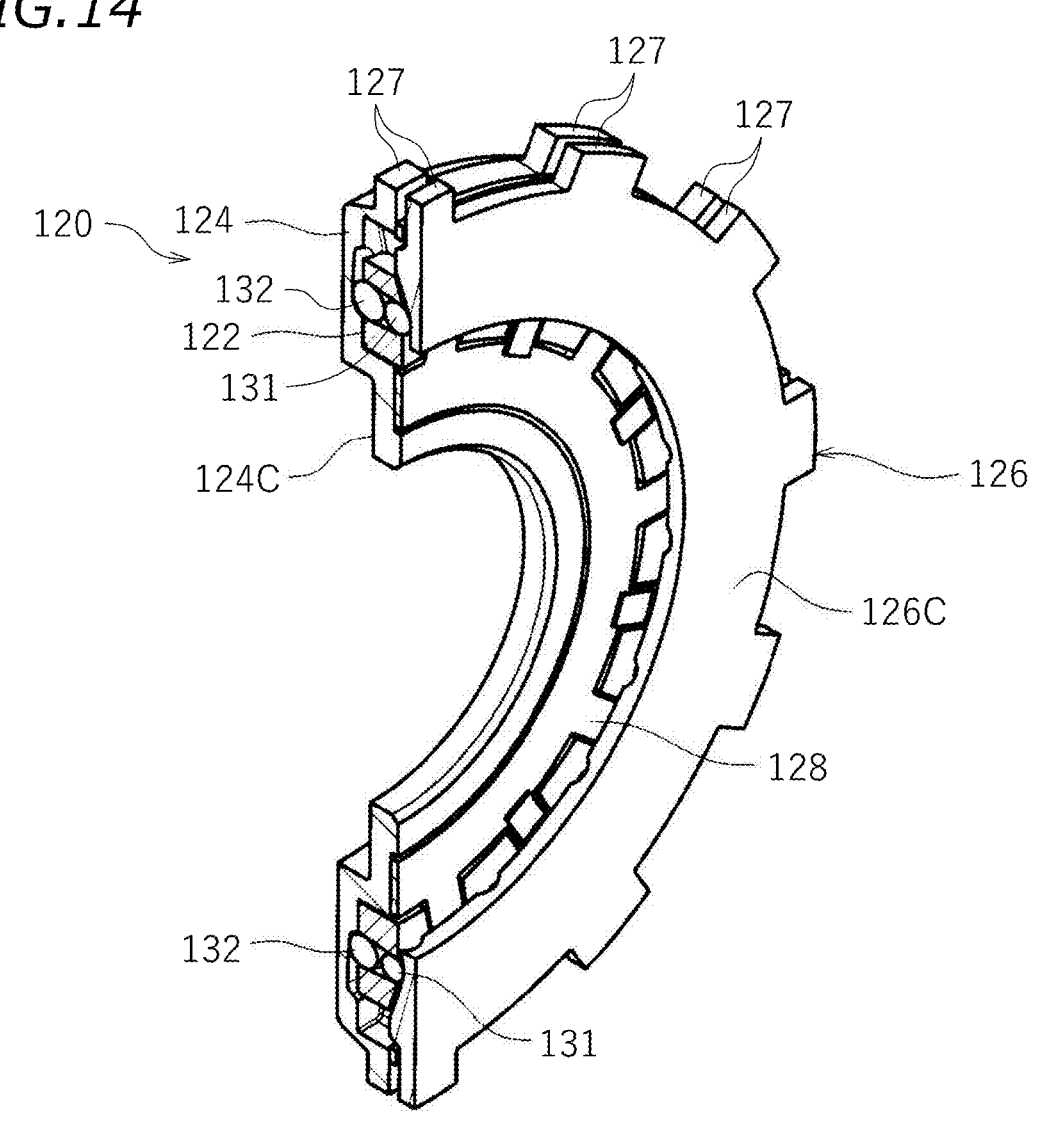
FIG. 14 is a partially cut-away perspective view of a centrifugal clutch mechanism according to an example embodiment of the present invention.

As illustrated in FIG. 1, the centrifugal clutch mechanism 120 is provided in the clutch housing 30. The centrifugal clutch mechanism 120 is provided in the first direction D1 relative to the clutch center 40. The centrifugal clutch mechanism 120 is held by the clutch housing 30. The centrifugal clutch mechanism 120 is rotatable together with the clutch housing 30. As illustrated in FIGS. 13 and 14, the centrifugal clutch mechanism 120 includes weights 122, a holding structure 124, a pressing structure 126, a supporting structure 128, first spherical structures 131, second spherical structures 132, and urging structures 135 (see FIG. 1). When the weights 122 are each located at a radially outer position, the centrifugal clutch mechanism 120 presses the input-side rotary plates 20 and the output-side rotary plates 22 against each other such that the rotational driving force of the input shaft is transmittable to the output shaft 15. When the weights 122 are each located at a radially inner position, the centrifugal clutch mechanism 120 releases the pressing force of the input-side rotary plates 20 and the output-side rotary plates 22 to be able to cut off transmission of the rotational driving force of the input shaft to the output shaft 15. The centrifugal clutch mechanism 120 is able to push the auxiliary clutch plate 150 (see FIG. 1).

The weights 122 are each movable from the radially inner position to the radially outer position with centrifugal force produced by rotation of the clutch housing 30. As illustrated in FIG. 13, the weights 122 are housed in housing portions 124A (which will be described below) of the holding structure 124. The weights 122 are each held at the radially inner position, with no centrifugal force being applied thereto. Upon application of centrifugal force to the weights 122, each weight 122 moves radially outward against an urging force of the associated urging structure 135 (see FIG. 1) and then reaches the radially outer position.

As illustrated in FIG. 13, the holding structure 124 holds the weights 122 such that the weights 122 are each movable between the radially inner position and the radially outer position. The holding structure 124 has an annular shape. The holding structure 124 preferably includes the circumferentially arranged housing portions 124A, grooves 124B defined in the housing portions 124A, and a pushing surface 124C. The housing portions 124A house the weights 122. The housing portions 124A each have a recessed shape conforming to the shape of the associated weight 122 and its moving range. The housing portions 124A are configured such that an end of each urging structure 135 (see FIG. 1) is allowed to abut against an outer peripheral wall surface 124AA of the associated housing portion 124A.

As illustrated in FIGS. 13 and 14, the pressing structure 126 is able to press the input-side rotary plates 20 and the output-side rotary plates 22 against each other by moving in the second direction D2 upon movement of each weight 122 from the radially inner position to the radially outer position. The pressing structure 126 has an annular shape. The pressing structure 126 preferably includes circumferentially arranged inclined grooves 126A, grooves 126B each continuous with an associated one of the inclined grooves 126A, and a pushing surface 126C. The inclined grooves 126A are each defined at a position opposing an associated one of the weights 122. The inclined grooves 126A are each inclined in the first direction D1 from its radially inner end to its radially outer end. With the clutch housing 30 brought to a halt, the weights 122 are each held at the radially inner position with the urging force of the associated urging structure 135 (see FIG. 1). Upon application of centrifugal force to the weights 122 caused by rotation of the clutch housing 30, the weights 122 move along the inclined grooves 126A, with the result that the pressing structure 126 moves in a direction away from the holding structure 124 (i.e., the second direction D2). Accordingly, the pushing surface 126C of the pressing structure 126 pushes the flange 68 (see FIG. 1) of the second clutch center 51 in the second direction D2. The holding structure 124 and the pressing structure 126 each include circumferentially arranged protrusions 127. Similarly to the input-side rotary plates 20, the holding structure 124 and the pressing structure 126 are held by the inner peripheral surface of the side wall 33 of the clutch housing 30 through the protrusions 127. The holding structure 124 and the pressing structure 126 are held by the clutch housing 30 through spline-fitting. The holding structure 124 and the pressing structure 126 are movable in the axial direction of the clutch housing 30 (i.e., the direction D). The holding structure 124 and the pressing structure 126 are rotatable together with the clutch housing 30.

As illustrated in FIGS. 13 and 14, the supporting structure 128 is attached to the holding structure 124. The supporting structure 128 is secured to a surface of the holding structure 124, which is provided with the housing portions 124A. The supporting structure 128 holds the weights 122 such that the weights 122 are each movable in a radial direction.

As illustrated in FIGS. 13 and 14, the first spherical structures 131 are attached to the weights 122. The first spherical structures 131 are preferably, for example, steel balls. Portions of the first spherical structures 131 protrude from first openings of through holes defined in the weights 122 and come into contact with a rolling contact surface of the pressing structure 126. The second spherical structures 132 are attached to the weights 122. The second spherical structures 132 are preferably, for example, steel balls. Portions of the second spherical structures 132 protrude from second openings of the through holes defined in the weights 122 and come into contact with a rolling contact surface of the holding structure 124.

As illustrated in FIG. 1, the urging structures 135 are radially outward of the weights 122. The urging structures 135 urge the weights 122 radially inward. The urging structures 135 are preferably, for example, coil springs.

With no centrifugal force being applied to the weights 122, the centrifugal clutch mechanism 120 described above holds each weight 122 at the radially inner position such that the pressing force of the input-side rotary plates 20 and the output-side rotary plates 22 is released. Upon application of centrifugal force to the weights 122, the centrifugal clutch mechanism 120 causes each weight 122 to move from the radially inner position to the radially outer position. Accordingly, the pushing surface 126C of the pressing structure 126 pushes the input-side rotary plates 20 and the output-side rotary plates 22 through the flange 68 of the second clutch center 51 such that the input-side rotary plates 20 and the output-side rotary plates 22 are pressed against each other, resulting in a state in which the rotational driving force of the input shaft is transmittable to the output shaft 15. In this case, the holding structure 124 moves in the first direction D1 such that the pushing surface 124C of the holding structure 124 pushes the auxiliary clutch plate 150.

As illustrated in FIG. 1, the auxiliary clutch plate 150 is provided in the clutch housing 30. The auxiliary clutch plate 150 is secured to the output shaft 15. The auxiliary clutch plate 150 is provided with an insertion hole 152H through which the output shaft 15 is inserted to be spline-fitted to the auxiliary clutch plate 150. The auxiliary clutch plate 150 is provided in the first direction D1 relative to a portion of the centrifugal clutch mechanism 120. The auxiliary clutch plate 150 is adjacent to the first clutch center 41.

The auxiliary clutch plate 150 is able to transmit the rotational driving force of the input shaft to the output shaft 15 upon being pushed by the centrifugal clutch mechanism 120 (i.e., the pushing surface 124C of the holding structure 124) when the input-side rotary plates 20 and the output-side rotary plates 22 are pressed against each other (i.e., when the weights 122 of the centrifugal clutch mechanism 120 are each located at the radially outer position). The auxiliary clutch plate 150 is configured to cut off transmission of the rotational driving force of the input shaft to the output shaft 15 upon being released from being pushed by the centrifugal clutch mechanism 120 (i.e., the pushing surface 124C of the holding structure 124) when the pressing force of the input-side rotary plates 20 and the output-side rotary plates 22 is released (i.e., when the weights 122 are each located at the radially inner position).

As illustrated in FIG. 1, the disc spring 180 is positioned concentrically with the pressure assembly 70. The disc spring 180 is between the pressure assembly 70 and the stopper plate 100. The disc spring 180 is retained by the first pressure structure 71 of the pressure assembly 70. More specifically, the disc spring 180 is retained by the third portion 71C of the first pressure structure 71. An inner peripheral end 180H of the disc spring 180 is retained by the third portion 71C of the first pressure structure 71. Positioning of the disc spring 180 with respect to the first pressure structure 71 is determined because the disc spring 180 is retained by the first pressure structure 71. As illustrated in FIG. 15, an outer edge 180S of the disc spring 180 in the radial direction of the output shaft 15 is located radially outward of the clutch springs 25. More specifically, on a straight line LX passing through an axis 15C of the output shaft 15 and an axis 25C of the associated clutch spring 25, the outer edge 180S of the disc spring 180 in the radial direction of the output shaft 15 is located radially outward of the associated clutch spring 25 as viewed in the axial direction of the output shaft 15. The outer edge 180S of the disc spring 180 in the radial direction of the output shaft 15 is required to be located radially outward of the associated clutch spring 25 at least on the straight line LX as viewed in the axial direction of the output shaft 15. The outer edge 180S of the disc spring 180 in the radial direction of the output shaft 15 is located radially outward of an imaginary circle LY (which is drawn around the axis 15C of the output shaft 15 and internally tangent to radially outer edges of the clutch springs 25) across an entire circumference of the disc spring 180. The outer edge 180S of the disc spring 180 in the radial direction of the output shaft 15 does not necessarily have to be located radially outward of the imaginary circle LY across the entire circumference of the disc spring 180. In other words, a portion of the outer edge 180S may be located radially inward of the imaginary circle LY. In one example, a portion of the outer edge 180S of the disc spring 180 located between the clutch springs 25 adjacent to each other in the circumferential direction S (see, for example, the reference sign Q in FIG. 15) may be at least partially located radially inward of the imaginary circle LY. The disc spring 180 urges the pressure assembly 70 (or more specifically, the first pressure structure 71) in the first direction D1. The disc spring 180 is, for example, a diaphragm spring.

Figure 16:
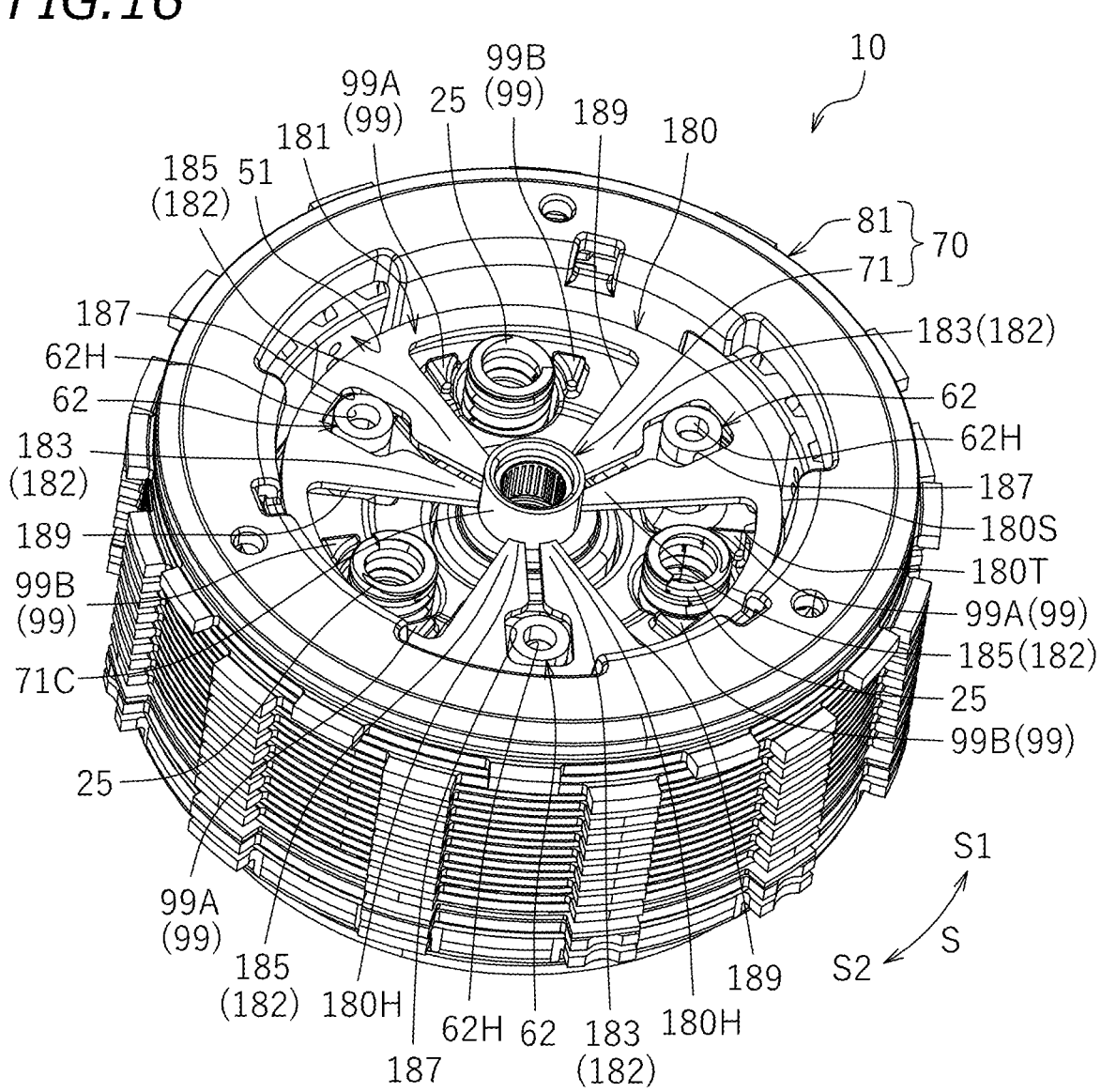
FIG. 16 is a perspective view of a clutch apparatus according to an example embodiment of the present invention.

As illustrated in FIGS. 15 and 16, the disc spring 180 preferably includes a body 181, extensions 182, first openings 187, and second openings 189.

As illustrated in FIG. 15, the body 181 includes a ring shape. As illustrated in FIG. 2, the body 181 is in contact with the stopper plate 100.

As illustrated in FIG. 15, the extensions 182 each preferably include a first extension 183 and a second extension 185. The first extensions 183 extend radially inward from a radially inner edge 180T of the body 181. The first extensions 183 are each located on the first side in the circumferential direction S relative to the associated boss 62 (i.e., located in the first circumferential direction S1 relative to the associated boss 62). The first extensions 183 are retained by the first pressure structure 71. The second extensions 185 extend radially inward from the radially inner edge 180T of the body 181. The second extensions 185 are each located on the second side in the circumferential direction S relative to the associated boss 62 (i.e., located in the second circumferential direction S2 relative to the associated boss 62). The second extensions 185 are retained by the first pressure structure 71. The first and second extensions 183 and 185 are separated from each other in the circumferential direction S. A distance L1 between each first extension 183 and the associated boss 62 in the circumferential direction S and a distance L2 between each second extension 185 and the associated boss 62 in the circumferential direction S are shorter than a distance L3 between each first extension 183 and the associated clutch spring 25 in the circumferential direction S and a distance L4 between each second extension 185 and the associated clutch spring 25 in the circumferential direction S. In this example embodiment, the distance L1 and the distance L2 are equal to each other. Alternatively, the distance L1 and the distance L2 may be different from each other. The distance L3 is longer than the distance L4.

As illustrated in FIG. 15, each first opening 187 is defined between the first and second extensions 183 and 185 of an associated one of the extensions 182 in the circumferential direction S. As illustrated in FIG. 16, the bosses 62 pass through the first openings 187. In other words, the bosses 62 are located inside the first openings 187. The first openings 187 are smaller in opening area than the second openings 189.

As illustrated in FIG. 15, each second opening 189 is defined between the first extension 183 of an associated one of the extensions 182 and the second extension 185 of another associated one of the extensions 182 in the circumferential direction S. As illustrated in FIG. 16, the clutch springs 25 pass through the second openings 189. The stoppers 99 pass through the second openings 189. In other words, the clutch springs 25 and the stoppers 99 are located inside the second openings 189.

As illustrated in FIG. 15, a distance L6 between each second stopper 99B and the disc spring 180 in the circumferential direction S is longer than a distance L5 between each first stopper 99A and the disc spring 180 in the circumferential direction S. The distance L5 between each first stopper 99A and the disc spring 180 in the circumferential direction S is longer than the distance L1 between each first extension 183 and the associated boss 62 in the circumferential direction S and the distance L2 between each second extension 185 and the associated boss 62 in the circumferential direction S.

As illustrated in FIG. 1, the stopper plate 100 is provided such that the stopper plate 100 is able to come into contact with the pressure assembly 70. The stopper plate 100 is a component to prevent the pressure assembly 70 from moving away from the clutch center 40 by a predetermined distance or more in the second direction D2. The stopper plate 100 is provided in the second direction D2 relative to the disc spring 180. The stopper plate 100 is secured to the bosses 62 of the first clutch center 41 with the bolts 28. With the clutch springs 25 provided in the spring housing portions 84 of the pressure assembly 70 and with the disc spring 180 retained by the first pressure structure 71, the bolts 28 are tightened into the bosses 62 and thus secured to the clutch center 40 through the stopper plate 100. The stopper plate 100 has a ring shape in a plan view.

In the clutch apparatus 10 according to the present example embodiment, the outer edge 180S of the disc spring 180 in the radial direction of the output shaft 15 is located radially outward of the clutch springs 25 as described above. This enables the disc spring 180 to be increased in diameter, with the result that the disc spring 180 is able to urge the pressure assembly 70 toward the clutch center 40 with a larger load. Consequently, the present example embodiment enables the clutch apparatus 10 to have a high degree of flexibility in load setting for the disc spring 180.

In the clutch apparatus 10 according to the present example embodiment, the pressure assembly 70 preferably includes the first pressure structure 71 that moves in the second direction D2 in response to a clutch operation, and the second pressure structure 81 holding the output-side rotary plates 22, externally fitted to the first pressure structure 71, and movable in the second direction D2 upon being pushed by the first pressure structure 71, the disc spring 180 urges the first pressure structure 71 in the first direction D1, and the clutch springs 25 urge the second pressure structure 81 in the second direction D1. In the above-described example embodiment, the disc spring 180 is able to urge the first pressure structure 71 toward the clutch center 40 with a larger load. Consequently, the present example embodiment enables the clutch apparatus 10 to have a high degree of flexibility in load setting for the disc spring 180, which urges the first pressure structure 71 in the first direction D1.

In the clutch apparatus 10 according to the present example embodiment, the first pressure structure 71 preferably has a tubular shape, and the inner peripheral end 180H of the disc spring 180 is retained by the first pressure structure 71. In the above-described example embodiment, the disc spring 180 is able to more effectively urge the first pressure structure 71 in the first direction D1.

In the clutch apparatus 10 according to the present example embodiment, the outer edge 180S of the disc spring

180 in the radial direction of the output shaft 15 is located radially outward of the imaginary circle LY (which is drawn around the axis 15C of the output shaft 15 and internally tangent to the radially outer edges of the clutch springs 25) across the entire circumference of the disc spring 180. The above-described example embodiment enables the disc spring 180 to have a larger diameter, with the result that the disc spring 180 is able to urge the pressure assembly 70 toward the clutch center 40 with a larger load.

In the clutch apparatus 10 according to the present example embodiment, the clutch center 40 includes the bosses 62 extending in the second direction D2, the pressure assembly 70 includes the pressure-side cam holes 83H through which the bosses 62 pass, and the disc spring 180 includes the first openings 187 through which the bosses 62 pass and the second openings 189 through which the clutch springs 25 pass. The above-described example embodiment makes it unnecessary to displace the bosses 62 and the clutch springs 25 with respect to the disc spring 180 and thus enables compact placement of the bosses 62, the clutch springs 25, and the disc spring 180.

In the clutch apparatus 10 according to the present example embodiment, the disc spring 180 preferably includes the ring-shaped body 181, the first extensions 183 each extending radially inward from the radially inner edge 180T of the body 181 and each located on the first side in the circumferential direction S relative to the associated boss 62, and the second extensions 185 each extending radially inward from the radially inner edge 180T of the body 181 and each located on the second side in the circumferential direction S relative to the associated boss 62, and the distance L1 between each first extension 183 and the associated boss 62 in the circumferential direction S and the distance L2 between each second extension 185 and the associated boss 62 in the circumferential direction S are shorter than the distance L3 between each first extension 183 and the associated clutch spring 25 in the circumferential direction S and the distance L4 between each second extension 185 and the associated clutch spring 25 in the circumferential direction S. If the clutch center 40 rotates relative to the disc spring 180, the above-described example embodiment would cause the first and second extensions 183 and 185 to come into contact with the bosses 62 first, making it possible to prevent contact of the first and second extensions 183 and 185 with the clutch springs 25.

In the clutch apparatus 10 according to the present example embodiment, the stopper plate 100 is provided such that the stopper plate 100 is able to come into contact with the pressure assembly 70 and prevents the pressure assembly 70 from moving away from the clutch center 40 by the predetermined distance or more in the second direction D2, the disc spring 180 is positioned between the stopper plate 100 and the pressure assembly 70, the pressure assembly 70 includes the stoppers 99 that extend in the second direction D2 and are able to come into contact with the stopper plate 100, and the stoppers 99 pass through the first openings 187 or the second openings 189. The above-described example embodiment makes it unnecessary to displace the stoppers 99 with respect to the disc spring 180 and thus enables compact placement of the stoppers 99 and the disc spring 180.

In the clutch apparatus 10 according to the present example embodiment, the stoppers 99 are provided on at least either the first side or the second side in the circumferential direction S relative to the clutch springs 25, and at least a portion of each stopper 99 overlaps with the associated clutch spring 25 as viewed in the radial direction of the output shaft 15. The above-described example embodiment involves effective use of spaces defined laterally of the clutch springs 25 in the circumferential direction S in placing the stoppers 99 and thus enables the pressure assembly 70 and/or the disc spring 180 to be more compact.

In the clutch apparatus 10 according to the present example embodiment, each stopper 99 preferably includes the first stopper 99A located on the first side in the circumferential direction S relative to the associated clutch spring 25 and provided adjacent to the associated pressure-side assist cam surface 90A, and the second stopper 99B located on the second side in the circumferential direction S relative to the associated clutch spring 25 and provided adjacent to the associated pressure-side slipper cam surface 90S, and the distance L6 between each second stopper 99B and the disc spring 180 in the circumferential direction S is longer than the distance between each first stopper 99A and the disc spring 180 in the circumferential direction S. Although the clutch center 40 may move more toward the pressure-side slipper cam surfaces 90S during rotation of the clutch center 40 relative to the pressure assembly 70, the above-described example embodiment is able to prevent the disc spring 180 and the second stoppers 99B from coming into contact with each other because the distance L6 is longer.

Some example embodiments of the present invention have been described thus far. The foregoing example embodiments, however, are only illustrative. The present invention may be embodied in various other forms.

In the foregoing example embodiments, the open end 71T of the first pressure structure 71 is provided with the first cut-outs 71H serving as the first oil passages. Alternatively, the open end 71T of the first pressure structure 71 may be provided with through hole (s) instead of cut-out(s) or may be provided with both of cut-out(s) and through hole(s).

In the foregoing example embodiments, the end 80AT of the defining wall 80A of the tubular portion 80, which is located in the first direction D1, is provided with the second cut-outs 81H serving as the second oil passages. Alternatively, the end 80AT of the defining wall 80A may be provided with through hole (s) instead of cut-out(s) or may be provided with both of cut-out(s) and through hole(s).

In the foregoing example embodiments, a portion of the second pressure structure 81 extending from the defining wall 80A of the tubular portion 80 to the pressure-side cam portions 90 is provided with the through holes 86 serving as the second oil passages. Alternatively, the portion of the second pressure structure 81 may be provided with cut-out (s) instead of through hole(s) or may be provided with both of cut-out(s) and through hole (s).

In the foregoing example embodiments, the stoppers 99 each include the first stopper 99A and the second stopper 99B. Alternatively, the stoppers 99 may each include at least one of the first stopper 99A and the second stopper 99B.

In the foregoing example embodiments, the stoppers 99 pass through the second openings 189. Alternatively, the stoppers 99 may pass through the first openings 187.

In the foregoing example embodiment, the clutch center 40 includes the first clutch center 41 and the second clutch center 51, and the first clutch center 41 and the second clutch center 51 are assembled to each other for use. Alternatively, the first clutch center 41 and the second clutch center 51 may be integral with each other.

In the foregoing example embodiments, the clutch center 40 includes the center-side assist cam surfaces 60A and the center-side slipper cam surfaces 60S. Alternatively, the clutch center 40 may include neither the center-side assist cam surfaces 60A nor the center-side slipper cam surfaces

60S. In the foregoing example embodiment, the pressure assembly 70 includes the pressure-side assist cam surfaces 90A and the pressure-side slipper cam surfaces 90S. Alternatively, the pressure assembly 70 may include neither the pressure-side assist cam surfaces 90A nor the pressure-side slipper cam surfaces 90S.

In the foregoing example embodiments, the engine is used as the power source. The power source, however, is not limited to the engine. Examples of the power source may include an electric motor.

A straddled vehicle according to an example embodiment of the present invention is a vehicle that a driver straddles to ride. The straddled vehicle is not limited to a motorcycle, such as a motor scooter. Examples of the straddled vehicle may include a motor tricycle, an all-terrain vehicle (ATV), and a snowmobile.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch apparatus to transmit a rotational driving force of an input shaft to an output shaft or cut off the rotational driving force, the clutch apparatus comprising:

a clutch center housed in a clutch housing holding input-side rotary plates to be rotationally driven in response to rotational driving of the input shaft, the clutch center holding output-side rotary plates arranged alternately with the input-side rotary plates, the clutch center being rotationally driven together with the output shaft;

a pressure assembly movable toward or away from the clutch center and rotatable relative to the clutch center, the pressure assembly being able to push the input-side rotary plates and the output-side rotary plates;

a disc spring provided concentrically with the pressure assembly, the disc spring urging the pressure assembly in a first direction, the first direction being a direction in which the pressure assembly moves toward the clutch center and a second direction being a direction in which the pressure assembly moves away from the clutch center; and a clutch spring urging the pressure assembly in the first direction; wherein the pressure assembly includes a housing portion to house the clutch spring; and an outer edge of the disc spring in a radial direction of the output shaft is located outward of the clutch spring in the radial direction.

2. The clutch apparatus according to claim 1, wherein the pressure assembly includes:

a first pressure structure that moves in the second direction in response to a clutch operation; and a second pressure structure externally fitted to the first pressure structure and movable in the second direction upon being pushed by the first pressure structure;

the disc spring urges the first pressure structure in the first direction; and the clutch spring urges the second pressure structure in the first direction.

3. The clutch apparatus according to claim 2, wherein the first pressure structure has a tubular shape; and an inner peripheral end of the disc spring is retained by the first pressure structure.

4. The clutch apparatus according to claim 1, wherein
the outer edge of the disc spring in the radial direction of the output shaft is located outward of an imaginary circle in the radial direction across an entire circumference of the disc spring, the imaginary circle being drawn around an axis of the output shaft and internally tangent to an outer edge of the clutch spring in the radial direction.

5. The clutch apparatus according to claim 1, wherein
the clutch center includes a boss extending in the second direction;
the pressure assembly includes a through hole through which the boss passes; and
the disc spring includes:
  a first opening through which the boss passes; and
  a second opening through which the clutch spring passes.

6. The clutch apparatus according to claim 5, wherein
the disc spring includes:
  a ring-shaped body;
  a first extension extending inward in the radial direction from an inner edge of the body in the radial direction and located on a first side in a circumferential direction relative to the boss; and
  a second extension extending inward in the radial direction from the inner edge of the body in the radial direction and located on a second side in the circumferential direction relative to the boss; and
a distance between the first extension and the boss in the circumferential direction and a distance between the second extension and the boss in the circumferential direction are shorter than a distance between the first extension and the clutch spring in the circumferential direction and a distance between the second extension and the clutch spring in the circumferential direction.

7. The clutch apparatus according to claim 5, comprising:
a stopper plate contactable with the pressure assembly to prevent the pressure assembly from moving away from the clutch center by a predetermined distance or more in the second direction; wherein
the disc spring is between the stopper plate and the pressure assembly;

the pressure assembly includes a stopper that extends in the second direction and is contactable with the stopper plate; and
the stopper passes through the first opening or the second opening.

8. The clutch apparatus according to claim 7, wherein
the stopper is located on at least one of a first side or a second side in a circumferential direction relative to the clutch spring; and
at least a portion of the stopper overlaps with the clutch spring as viewed in the radial direction of the output shaft.

9. The clutch apparatus according to claim 8, wherein
the pressure assembly includes pressure-side cam portions each including:
  a pressure-side assist cam surface to, upon being rotated relative to the clutch center, produce a force in a direction in which the pressure assembly is moved toward the clutch center to increase a pushing force for the input-side rotary plates and the output-side rotary plates; and
  a pressure-side slipper cam surface to, upon being rotated relative to the clutch center, move the pressure assembly away from the clutch center so as to reduce the pushing force for the input-side rotary plates and the output-side rotary plates;
the stopper includes:
  a first stopper located on the first side in the circumferential direction relative to the clutch spring and adjacent to the pressure-side assist cam surface; and
  a second stopper located on the second side in the circumferential direction relative to the clutch spring and adjacent to the pressure-side slipper cam surface; and
a distance between the second stopper and the disc spring in the circumferential direction is longer than a distance between the first stopper and the disc spring in the circumferential direction.

\* \* \* \* \*